(12) United States Patent
Feng et al.

(10) Patent No.: US 11,366,496 B2
(45) Date of Patent: Jun. 21, 2022

(54) FLEXIBLE DISPLAY DEVICE AND CONTROL METHOD THEREOF

(71) Applicant: Xiamen Tianma Micro-Electronics Co., Ltd., Xiamen (CN)

(72) Inventors: Hebing Feng, Shanghai (CN); Shaorong Yu, Shanghai (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 56 days.

(21) Appl. No.: 17/133,119

(22) Filed: Dec. 23, 2020

(65) Prior Publication Data

US 2021/0116971 A1 Apr. 22, 2021

(30) Foreign Application Priority Data

Oct. 29, 2020 (CN) .......................... 202011179382.0

(51) Int. Cl.
*G06F 1/16* (2006.01)
*G09F 9/30* (2006.01)

(52) U.S. Cl.
CPC .......... *G06F 1/1652* (2013.01); *G06F 1/1681* (2013.01); *G09F 9/301* (2013.01)

(58) Field of Classification Search
CPC combination set(s) only.
See application file for complete search history.

(56) References Cited

U.S. PATENT DOCUMENTS

| | | | |
|---|---|---|---|
| 9,506,279 B2 * | 11/2016 | Kauhaniemi | H04M 1/0216 |
| 9,697,941 B2 * | 7/2017 | Lee | H01F 7/20 |
| 9,733,744 B2 * | 8/2017 | Lee | G06F 1/1616 |
| 9,910,458 B2 * | 3/2018 | Watanabe | H04M 1/0268 |
| 10,063,677 B2 * | 8/2018 | Cavallaro | G06F 1/1652 |
| 10,082,827 B2 * | 9/2018 | Yamauchi | G06F 1/1652 |
| 10,331,247 B2 * | 6/2019 | Jinbo | G06F 1/1616 |
| RE47,619 E * | 9/2019 | Kauhaniemi | H05K 5/0226 |
| 10,678,305 B1 * | 6/2020 | Lee | G06F 1/1641 |

(Continued)

FOREIGN PATENT DOCUMENTS

| | | |
|---|---|---|
| CN | 108538208 A | 9/2018 |
| CN | 110049159 A | 7/2019 |

(Continued)

OTHER PUBLICATIONS

Chinese Office Action dated Dec. 31, 2021, issued in CN Application No. 202011179382.0 filed on Oct. 29, 2020, 19 pages.

*Primary Examiner* — Lisa Lea-Edmonds
(74) *Attorney, Agent, or Firm* — Christensen O'Connor Johnson Kindness PLLC

(57) ABSTRACT

A flexible display device and a control method thereof are provided. In an embodiment, the flexible display device includes a display panel, and the display panel includes a first flexible region. In an embodiment, the he flexible display device further includes supporting structures, and a first supporting plate for supporting the supporting structures. In an embodiment, the he supporting structures can support the first flexible region according to the usage states of the first flexible region, such that the first flexible region can be effectively supported at different usage states, which improves the user experience and the service life of the first flexible region, thereby ensuring the performance stability of the flexible display device.

20 Claims, 20 Drawing Sheets

(56) References Cited

U.S. PATENT DOCUMENTS

| | | | | |
|---|---|---|---|---|
| 10,736,225 B2* | 8/2020 | Choi | .................... | H05K 5/0017 |
| 10,827,631 B2* | 11/2020 | Liu | ......................... | G09F 9/301 |
| 10,908,639 B2* | 2/2021 | Shibayama | ............ | G06F 1/1658 |
| 11,132,027 B2* | 9/2021 | Park | .................... | H04M 1/0216 |
| 11,153,980 B2* | 10/2021 | Hirakata | ............. | H01L 27/3262 |
| 11,223,023 B2* | 1/2022 | Zhang | ................ | H01L 51/5237 |
| 11,258,035 B2* | 2/2022 | Kim | .................... | H01L 51/5237 |
| 11,287,854 B2* | 3/2022 | Morino | ................. | G06F 1/1652 |
| 2021/0325929 A1* | 10/2021 | Cai | ......................... | B32B 3/266 |
| 2021/0343974 A1* | 11/2021 | Zhang | ................ | H04M 1/0268 |
| 2022/0019268 A1* | 1/2022 | Yu | ........................ | H04M 1/0268 |
| 2022/0046813 A1* | 2/2022 | Cheng | ................. | H04M 1/022 |

FOREIGN PATENT DOCUMENTS

| | | |
|---|---|---|
| CN | 110428732 A | 11/2019 |
| CN | 110827691 A | 2/2020 |

* cited by examiner

FLEXIBLE DISPLAY DEVICE AND CONTROL METHOD THEREOF

CROSS-REFERENCE TO RELATED APPLICATIONS

The present application claims priority to Chinese Patent Application No. 202011179382.0, filed on Oct. 29, 2020, the content of which is incorporated herein by reference in its entirety.

TECHNICAL FIELD

The present application relates to the display technical field, and particularly, to a flexible display device and a control method thereof.

BACKGROUND

With the development of the display technology, flexible display technology has become the focus of current research. At present, the flexible display technology is applied in various areas including, for example, electronic devices such as foldable display devices and rollable display devices. Due to the flexibility of the display panel, the display devices can be folded or rolled in different application scenarios, thereby improving sensory experience and comfort of the users. However, in existing flexible display devices, a flexible region cannot be supported effectively under different application conditions, which may affect the users' experience and also shorten the service life of the flexible region.

SUMMARY

A flexible display device and a control method thereof are provided according to an embodiment of the present disclosure, in order to enhance the user experience and guarantee the service life of the flexible display device.

In a first aspect, a flexible display device is provided according to an embodiment of the present disclosure. In an embodiment, the flexible display device includes: a display panel including a first flexible region divided into a plurality of flexible sub-regions, a second region, and a third region; a plurality of supporting structures, each of the plurality of supporting structures corresponding to a respective one of the plurality of flexible sub-region, each of the plurality of supporting structures including a supporting body, and the supporting body including a supporting surface close to a corresponding one of the plurality of flexible sub-regions; and a first supporting plate configured to support the plurality of supporting structures. In an embodiment, the first flexible region has usage states including a flattened state and a bent state; in the flattened state, the second region, the first flexible region, and the third region are sequentially arranged in a first direction; in the bent state, the first flexible region is bent, the display panel has a bending angle $\theta$, $\theta$ satisfies $0°\leq\theta<180°$, and the bending angle $\theta$ is an angle between the second region and the third region. In an embodiment, the he plurality of supporting structures is configured to support the first flexible region according to the usage states of the first flexible region, by changing a vertical distance between a geometric center of the supporting surface and the first supporting plate with a vertical distance between the first supporting plate and a geometric center of a flexible sub-region corresponding to the supporting surface.

In a second aspect, a control method of a flexible display device is provided according to an embodiment of the present disclosure. In an embodiment, the he flexible display device includes: a display panel including a first flexible region, a second region, and a third region, the first flexible region being divided into a plurality of flexible sub-regions; a plurality of supporting structures, each of the plurality of supporting structures corresponding to a respective one of the plurality of flexible sub-regions, each of the plurality of supporting structures including a supporting body, and the supporting body including a supporting surface close to a corresponding one of the plurality of flexible sub-regions; and a first supporting plate configured to support the plurality of supporting structures. In an embodiment, the he first flexible region has usage states comprising a flattened state and a bent state; in the flattened state, the second region, the first flexible region, and the third region are sequentially arranged in a first direction; in the bent state, the first flexible region is bent, the display panel has a bending angle $\theta$, $\theta$ satisfies $0°\leq\theta<180°$, and the bending angle $\theta$ is an angle between the second region and the third region. In an embodiment, the he control method includes: controlling the plurality of supporting structures to support the first flexible region according to the usage states of the first flexible region, by changing a vertical distance between the first supporting plate and a geometric center of one of the plurality of supporting surfaces with a vertical distance between the first supporting plate and a geometric center of one flexible sub-region corresponding to the one of the plurality of supporting surfaces.

In a third aspect, a flexible display device is provided according to an embodiment of the present disclosure. In an embodiment, the he flexible display device includes: a display panel including a first flexible region and a second flexible region connected to the first flexible region, the first flexible region being divided into a plurality of flexible sub-regions; a main supporting plate; a receiving cabin; a plurality of supporting structures, each of the plurality of supporting structure corresponding to a respective one of the plurality of flexible sub-regions; and a first supporting plate configured to support the plurality of supporting structures. In an embodiment, the he first flexible region has usage states including a pull-out state and an undrawn state. In the undrawn state, the main supporting plate supports the first flexible region, the first supporting plate overlaps with the main supporting plate, the first supporting plate and the plurality of supporting structures are all located on a side of the main supporting plate facing away from the first flexible region, and the second flexible region is received in the receiving cabin. In the pull-out state, a displacement of the first flexible region relative to the main supporting plate occurs, at least a part of the second flexible region is pulled out of the receiving cabin with the displacement of the first flexible region, and a pull-out part of the second flexible region is supported by the main supporting plate; and a displacement occurs between the first supporting plate and the main supporting plate, the supporting structure supports the flexible sub-region corresponding to the supporting structure with the displacement of the first flexible region.

In a fourth aspect, a control method of a flexible display device is provided according to an embodiment of the present disclosure. In an embodiment, the he flexible display device includes: a display panel including a first flexible region and a second flexible region connected to the first flexible region, the first flexible region being divided into a plurality of flexible sub-regions; a main supporting plate; a receiving cabin; a plurality of supporting structures, each of the plurality of supporting structures corresponding to a respective one of the plurality of flexible sub-regions; and a first supporting plate configured to support the plurality of supporting structures. In an embodiment, the he first flexible region has usage states including a pull-out state and an undrawn state. In the undrawn state, the main supporting plate supports the first flexible region, the first supporting plate overlaps with the main supporting plate, the first supporting plate and the plurality of supporting structures are all located on a side of the main supporting plate facing away from the first flexible region, and the second flexible region is received in the receiving cabin. In the pull-out state, a displacement of the first flexible region relative to the main supporting plate occurs, at least a part of the second flexible region is pulled out of the receiving cabin with the displacement of the first flexible region, and the pull-out part of the second flexible region is supported by the main supporting plate; and a displacement occurs between the first supporting plate and the main supporting plate. In an embodiment, the he control method includes: in the pull-out state, controlling at least one supporting structure to support a flexible sub-region corresponding to the at least one supporting structure along with the displacement of the first flexible region.

BRIEF DESCRIPTION OF DRAWINGS

In order to clearly explain embodiments of the present disclosure or the technical solutions in the related art, the drawings to be used for describing the embodiments or the related art are briefly introduced below. The following drawings are merely some of the embodiments of the present disclosure. Those skilled in the art can derive other drawings from these drawings without paying creative effort.

DESCRIPTION OF EMBODIMENTS

For clearly explaining the objects, technical solutions and advantages of the present disclosure, embodiments of the present disclosure are described in detail with reference to the drawings as below. It should be understood that the embodiments described below are merely some of, rather than all of the embodiments of the present disclosure. Based on the embodiments described in the present disclosure, all other embodiments obtained by those skilled in the art shall without paying creative effort fall within the protection scope of the present disclosure.

The terms used in the embodiments of the present disclosure are merely for the purpose of describing specific embodiments, but not intended to limit the present disclosure. The singular forms of "a", "an" and "the" used in the embodiments of the present disclosure and the appended claims are also intended to indicate plural forms, unless clearly indicating others.

In conventional devices, the flexible region cannot be effectively supported in different usage states, which affects the user experience. A foldable and flexible display device is provided according to an embodiment of the present disclosure. A display panel of the flexible display device includes a first flexible region, and the first flexible region can be bent to different degrees to achieve different degrees of folding of the flexible display device. A plurality of supporting structures and the first supporting plate configured to support the plurality of supporting structures are provided. The supporting structures are used to support the first flexible region according to a bent state or a flattened state of the first flexible region, so as to ensure that the first flexible region in different states can be effectively supported. A pull-type flexible display device is provided according to an embodiment of the present disclosure. The first flexible region has usage states of a pull-out state and an undrawn state. The first supporting plate and the supporting structures supported by the first supporting plate are configured to constantly support the first flexible region in the pull-out state, so as to ensure that the first flexible region in the pull-out state can be effectively supported. The first flexible region in the pull-out state can also exert functions such as touch control, thereby improving user experience.

A foldable flexible display device and a control method thereof provided by the embodiments of the present disclosure are described as below.

Figure 1:
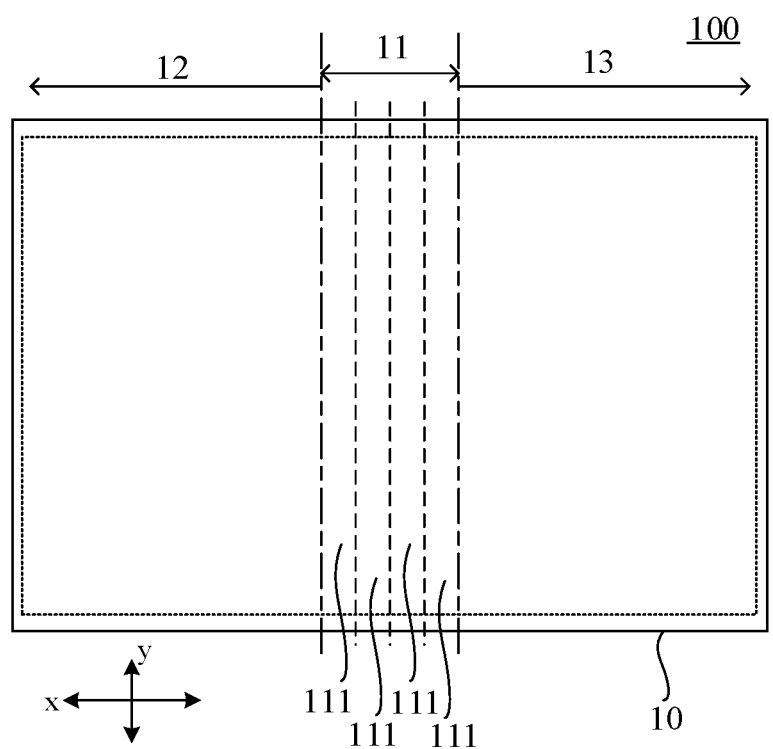
FIG. 1 is a schematic diagram of a flexible display device according to an embodiment of the present disclosure.
Figure 2:
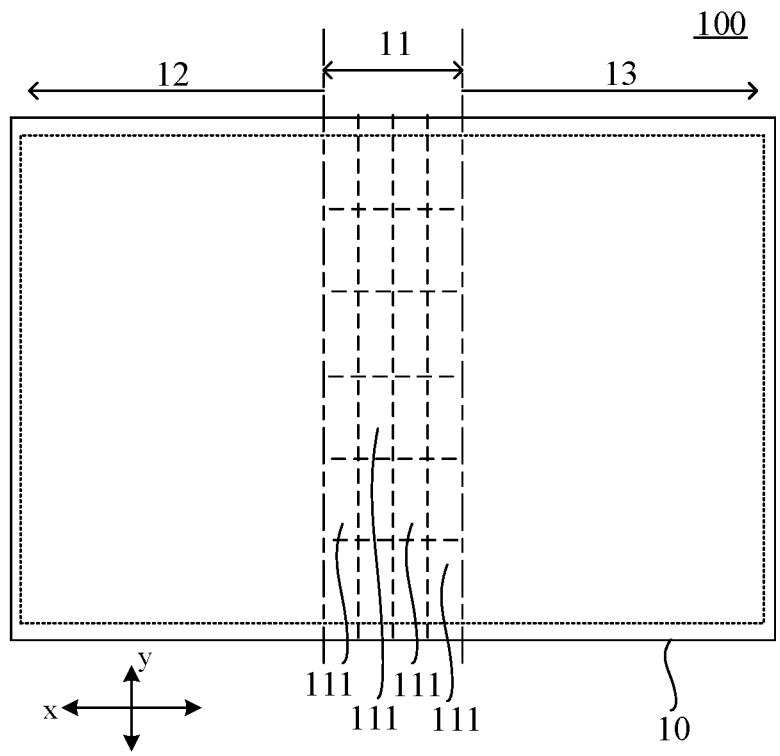
FIG. 2 is a schematic diagram of a flexible display device according to another embodiment of the present disclosure.
Figure 3:
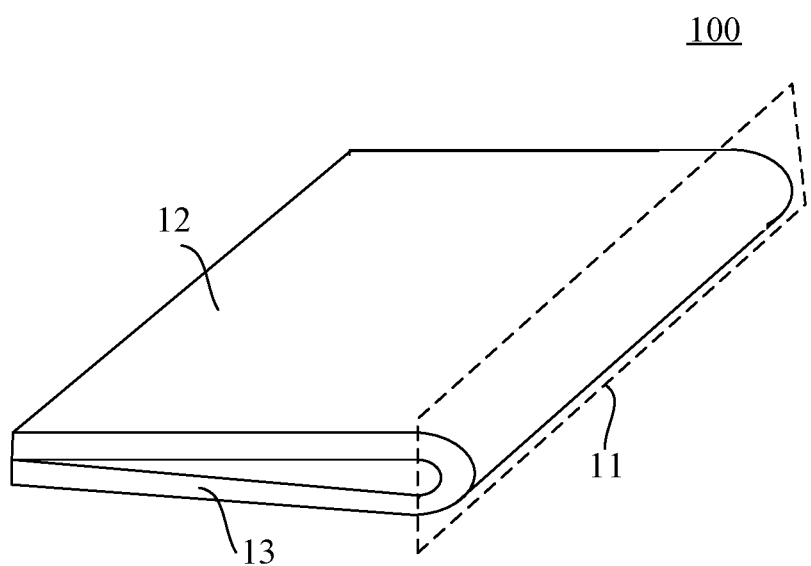
FIG. 3 is a schematic diagram of a flexible display device in a bent state according to an embodiment of the present disclosure.
Figure 4:
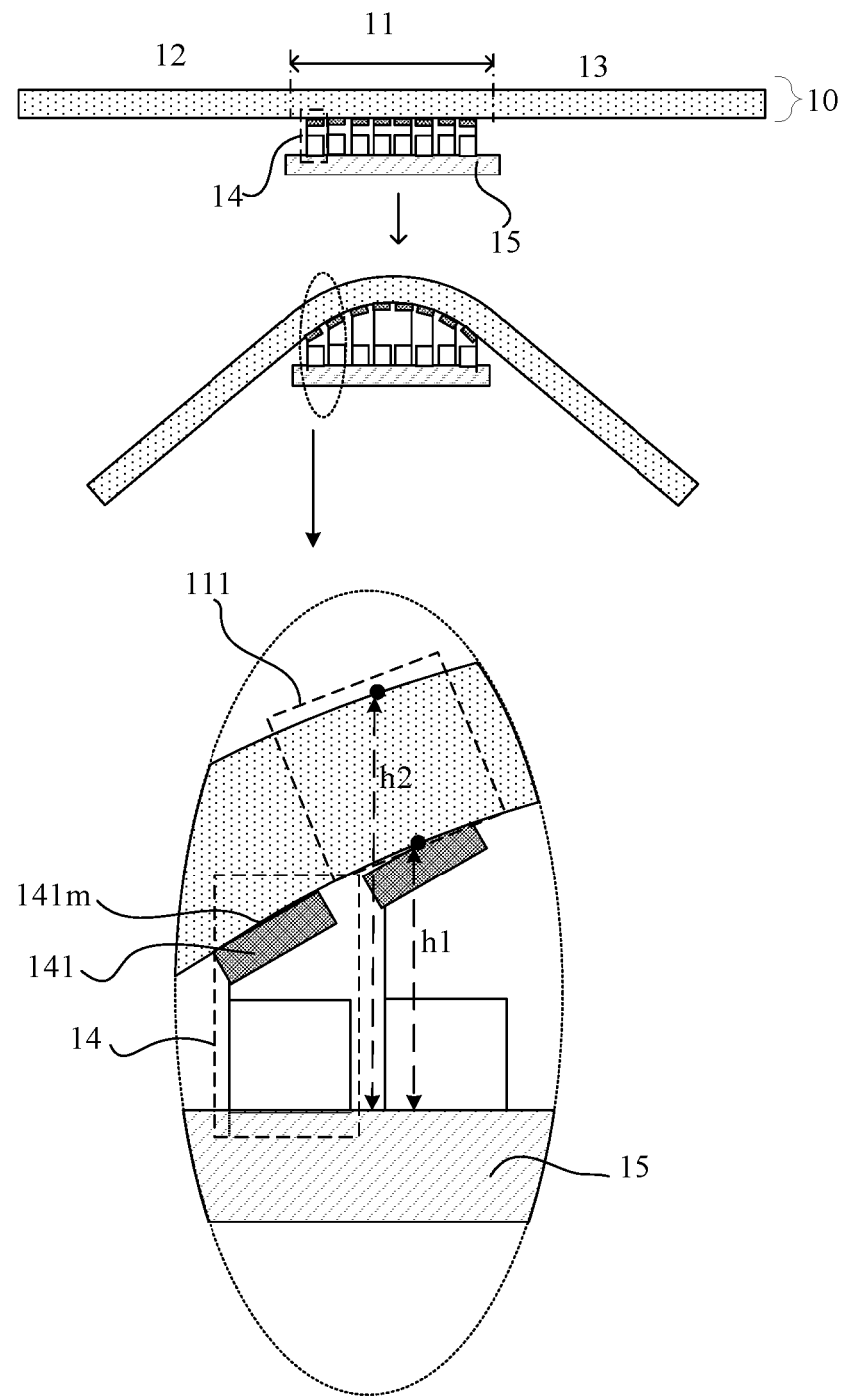
FIG. 4 is a schematic diagram of a flexible display device changing from a flattened state to a bent state according to an embodiment of the present disclosure.

FIG. 1 is a schematic diagram of a flexible display device according to an embodiment of the present disclosure, FIG. 2 is a schematic diagram of a flexible display device according to another embodiment of the present disclosure, FIG. 3 is a schematic diagram of a flexible display device in a bent state according to an embodiment of the present disclosure, and FIG. 4 is a schematic diagram of a flexible display device changing from a flattened state to a bent state according to an embodiment of the present disclosure.

As shown in FIG. 1 and FIG. 2, the flexible display device 100 includes a display panel 10. The display panel 10 includes a first flexible region 11, a second region 12 and a third region 13. The first flexible region 11 is divided into a plurality of flexible sub-regions 111. FIG. 1 and FIG. 2 both illustrate the display panel 10 in a flattened state. When the first flexible region 11 is in the flattened state, the second region 12, the first flexible region 11 and the third region 13 are sequentially arranged in a first direction x. FIG. 1 illustrates a division manner of the first flexible region 11, in which the first flexible region 11 is divided into the plurality of flexible sub-regions 111 sequentially arranged in the first direction x, and each flexible sub-region 111 is in a shape of long strip extending in a second direction y. The second direction y intersects the first direction x. In some embodiments, the second direction y and the first direction x are perpendicular to each other. FIG. 2 illustrates another division manner of the first flexible region 11, in which the first flexible region 11 is divided into the plurality of flexible sub-regions 111 arranged in an array. In the array, the plurality of flexible sub-regions 111 is arranged in rows along the first direction x and arranged in columns in the second direction y.

FIG. 1 and FIG. 2 both illustrate the display panel 10 in the flattened state. In addition, the usage state of the first flexible region may also include a bent state. As illustrated in FIG. 3, when the first flexible region 11 is in the bent state, the entire flexible display device 100 is in the bent state. When the first flexible region is bent, the display panel has a bending angle θ, and the bending angle satisfies 0°≤θ<180°. The bending angle θ is an angle between the second region 12 and the third region 13. The angle between the second region 12 and the third region 13 can be interpreted as an angle between two opposite surfaces of the second region 12 and the third region 13 in the bent state of the first flexible region 11. FIG. 3 shows a state in which the display panel 100 is folded in half to allow the second region 12 and the third region 13 to face each other. In this state, the bending angle θ is approximately 0°. In the flattened state of the first flexible region 11, the second region 12 and the third region 13 are basically on the same plane. The bending of the first flexible region 11 allows the flexible display device to be changed from the flattened state to a folded state. When the first flexible region 11 is in the flattened state and is to be bent, the bending angle θ of the display panel is the largest. As the bending degree of the first flexible region 11 is increased, the bending angle θ of the display panel gradually is reduced, until the display panel 100 is folded in half. At different bending stages of the first flexible region 11, the display panel has different bending angles.

Further referring to FIG. 4, the flexible display device further includes a plurality of supporting structures 14, and a first supporting plate 15 configured to support the plurality of supporting structures 14. For example, the first supporting plate 15 is a rigid supporting plate with a certain hardness. One supporting structure 14 corresponds to one flexible sub-region 111. As shown in FIG. 1, one of the flexible sub-regions 111 is in a long strip shape, which corresponds to one supporting structure 14. As shown in FIG. 2, the flexible sub-region 111 is in a block shape, and one block-shaped flexible sub-region 111 corresponds to one supporting structure 14. Each supporting structure 14 includes a supporting body 141, and the supporting body 141 includes a supporting surface 141m at a side close to the flexible sub-region 111. The supporting structure 14 is disposed under the corresponding flexible sub-region 111, accordingly.

In an embodiment of the present embodiment, the plurality of supporting structures 14 is configured to support the first flexible region 11 according to the usage state of the first flexible region 11. A vertical distance h1 between the first supporting plate 15 and a geometric center (indicated with black solid) of the supporting surface 141m changes synchronously with a vertical distance h2 between the first supporting plate 15 and a geometric center (indicated with black solid) of the flexible sub-region 111. The actual display panel 10 has a certain thickness. In FIG. 4, for example, a geometric center of a surface of the flexible sub-region 111 facing away from the first supporting plate 15 is taken as the geometric center of the flexible sub-region 111. In a process of determining a variation of the vertical distance h2 between a geometric center of the flexible sub-region 111 and the first supporting plate 15, it is also possible to determine the variation of the vertical distance h2 by taking a geometric center of a surface of the flexible sub-region 111 close to the first supporting plate 15 as the geometric center of the flexible sub-region 111.

In the bent state of the first flexible region 11, the flexible sub-regions 111 located at different positions have different bending forms, and thus the flexible sub-regions 111 located at different positions have different vertical distances with respect to the first supporting plate 15. In addition, at different bending stages of the first flexible region 11, the vertical distance between the flexible sub-region 111 at the same position and the first supporting plate 15 varies. When the vertical distance h1 between the geometric center of the supporting surface 141m and the first supporting plate 15 changes synchronously with the vertical distance h2 between the geometric center of the corresponding flexible sub-region 111 and the first supporting plate 15, the respective supporting structures 14 support the corresponding flexible sub-regions 111 according to the bending forms of the corresponding flexible sub-regions 111. In this way, when the first flexible region 11 is bent, each flexible sub-region at a different bending degree is ensured to be effectively supported.

In the flattened state of the first flexible region 11, with the variation of the vertical distance h2 between the geometric center of the flexible sub-region 111 and the first supporting plate 15, the vertical distance h1 between the geometric center of the corresponding supporting surface 141m and the first supporting plate 15 varies accordingly. In this regard, each supporting structure 14 can support the corresponding flexible sub-region 111. In this way, the plurality of supporting structures 14 supports the first flexible region 11 to ensure a flatness of the first flexible region 11, thereby overcoming the problems in conventional devices where the flexible region in the flattened state has creases, dents or bulges formed after multiple times of bending.

In the above embodiment, the vertical distance between the geometric center of the supporting surface 141m and the first supporting plate 15 changes synchronously with the vertical distance between the geometric center of the corresponding flexible sub-region 111 and the first supporting plate 15. In this way, it is illustrated that the supporting structures 14 support the first flexible region 11 according to the usage states of the first flexible region 11. The vertical distance between the geometric center of the flexible sub-region 111 and the first supporting plate 15 reflects the state of the flexible sub-region 111 in different bending stages. In practice, when the first flexible region 11 is bent, the state of the flexible sub-region 111 can be also reflected by a vertical distance between any other position point of the flexible sub-region 111 and the first supporting plate 15 or vertical distances between multiple position points of the flexible sub-region 111 and the first supporting plate 15. That is, in the embodiments of the present disclosure, any measurement characterizing the state of the flexible sub-region 111 by a vertical distance with respect to the first supporting plate can be used to allow the supporting structures to support the flexible sub-regions in real-time.

The geometric center of the supporting surface and the geometric center of the corresponding flexible sub-region are two fixed positions. In practice, the supporting structure 14 corresponds to the flexible sub-region 111. When the first flexible region 11 is in the flattened state, a vertical line perpendicular to the first supporting plate 15 passes through the supporting surface 141m of the supporting body 141 and the flexible sub-region 111, and an intersection of the vertical line and the supporting surface 141m and an intersection of the same vertical line and the flexible sub-region 111 are two fixed positions. The intersection of the vertical line and the supporting surface 141m is a first position, and the intersection of the same vertical line and the flexible sub-region 111 is a second position. In an embodiment of the present disclosure, the vertical distance between the first position and the first supporting plate 15 changes with the vertical distance between the second position and the first supporting plate 15, such that the supporting structures 14 can support the first flexible region 11 according to the usage state of the first flexible region 11.

In conventional foldable and flexible display device, a hinge structure is correspondingly provided at a flexible region (corresponding to the first flexible region in the present disclosure) of the display panel. The hinge structure allows the flexible region to be bent and thus allows the display panel to switch between the flattened state and the folded state. However, the design of the hinge structure fails to consider the supporting of the flexible region. Thus, the hinge structure cannot effectively support the flexible region in the bending process in which the display panel is switched from the flattened state to the folded state. In an outwards bending process of the flexible display device as provided by the embodiments of the present disclosure (i.e., a display surface of the display panel in the folded state faces outwards), a bending radius of the display panel is relatively great, and the hinge structure may cause an over-stretching of the display panel, which results in the breakage of the wirings in the display panel or cracks formed in some film structures in the display panel, thereby affecting the performance reliability of the flexible display device.

In a flexible display device provided by an embodiment of the present disclosure, the plurality of supporting structures and the first supporting plate are provided, the first supporting plate is configured to support the plurality of supporting structures, one supporting structure correspond to one flexible sub-region. The distance between the geometric center of the supporting surface of the supporting structure and the first supporting plate changes with the distance between the geometric center of the flexible sub-region and the first supporting plate. In this way, in the bending process of the display panel, the supporting structure can support the flexible sub-region according to a real-time state of the flexible sub-region, so as to ensure that when the first flexible region is in the flattened state or the different stages of the bent state, each flexible sub-region can be effectively supported, and the plurality of supporting structures support the first flexible region according to the usage state of the first flexible region. Thus, the user experience is improved, the problems that the flexible region in the flattened state has creases, dents or bulges formed after multiple times of bending of the first flexible region are overcome, and the service life of the flexible display device is maintained. In addition, since the supporting structures support the flexible sub-regions in real-time in the bending process, the overstretching of flexible display device can be avoided in the outwards bending process, improving the performance reliability of the flexible display device.

Figure 5:
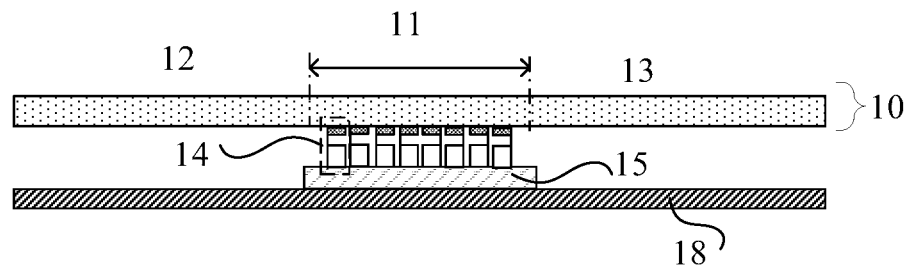
FIG. 5 is a schematic diagram of a flexible display device according to another embodiment of the present disclosure.

FIG. 5 is a schematic diagram of a flexible display device according to another embodiment of the present disclosure. As shown in FIG. 5, the flexible display device further includes a protective housing 18 located at a side of the first supporting plate 15 facing away from the display panel 10. The first supporting plate 15 is fixedly connected to the protective housing 18. The protective housing 18 protect the display panel 10 at the back side of the display panel 10. When the first flexible region 11 is bent, the protective housing can be bent correspondingly at a position corresponding to the junction of the first flexible region 11 and the second region 12, and a position corresponding to the junction of the first flexible region 11 and the third region 13. Thus, the protective housing, together with the display panel, forms a certain bending angle θ. By providing the protective housing, the first supporting plate and the supporting structures are enclosed inside the apparatus, which can prevent external dust or water vapor in the air from entering the inside of the apparatus, thereby isolating elements inside the device from the environment and protecting the element inside the device from being affected by the environment, ensuring the service life of the apparatus.

Figure 6:
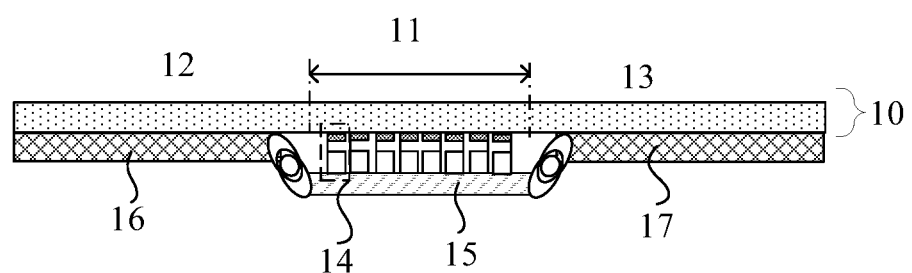
FIG. 6 is a schematic diagram of a flexible display device according to another embodiment of the present disclosure.

Further, FIG. 6 is a schematic diagram of a flexible display device according to another embodiment of the present disclosure. As shown in FIG. 6, the flexible display device further includes a second supporting plate 16 and a third supporting plate 17, the second supporting plate 16 is connected to the second region 12 and configured to support the second region 12, and the third supporting plate 17 is connected to the third region 13 and configured to support the third region 13. The second supporting plate 16 is rotationally connected to the first supporting plate 15, and the third supporting plate 17 is rotationally connected to the first supporting plate 15. It can realize a mutual rotation between the second supporting plate 16 and the first supporting plate 15, and a mutual rotation between the third supporting plate 17 and the first supporting plate 15. When the first flexible region is bent, the rotational connection of the second supporting plate 16 and the first supporting plate 15 and the rotational connection of the third supporting plate 17 and the first supporting plate 15 can assist the bending of the display panel. At the same time, the positions of the rotational connections can also play a certain role in fixing the first supporting plate, ensuring the stability of the overall structure of the display device.

For example, the second supporting plate 16 and the first supporting plate 15 are connected through a shaft, and the third supporting plate 17 and the first supporting plate 15 are connected through a shaft.

For example, the vertical distance between the geometric center of the supporting surface 141m and the first supporting plate 15 has a positive correlation with the vertical distance between the geometric center of the flexible sub-region 111 and the first supporting plate 15. In other words, the supporting structure 14 corresponds to the flexible sub-region 111. When the vertical distance between the geometric center of the flexible sub-region 111 and the first supporting plate 15 increases, the vertical distance between the geometric center of the supporting surface 141m and the first supporting plate 15 increases accordingly; and when the vertical distance between the geometric center of the flexible sub-region 111 and the first supporting plate 15 decreases, the vertical distance between the geometric center of the supporting surface 141m and the first supporting plate 15 decreases accordingly. In this way, each supporting structure can support the corresponding flexible sub-region according to the usage state of the first flexible region, so as to ensure each position of the first flexible region to be effectively supported.

In an embodiment, a geometric center of a surface of the flexible sub-region 111 close to the first supporting plate 15 is taken as the geometric center of the flexible sub-region 111. When the supporting structure 14 supports the flexible sub-region 111 in such a manner that the supporting surface 141 of the supporting structure 14 contacts a side surface of the flexible sub-region 111 close to the first supporting plate 15, the vertical distance between the geometric center of the supporting surface 141m and the first supporting plate 15 is equal to the vertical distance between the geometric center of the flexible sub-region 111 and the first supporting plate 15.

In conventional devices, a hinge structure is correspondingly provided at the flexible region (corresponding to the first flexible region in the present disclosure) of the display panel, and the designed display panel has a flattened state and a folded state (similar as that shown in FIG. 3). The hinge structure allows the flexible region to be bent and thus allows the display panel to switch between the flattened state and the folded state. In either the folded state or the flattened state, the hinge structure can support the flexible region. However, in the transition from the flattened state to the folded state, the hinge structure cannot support different positions of the flexible region at different bending stages of the flexible region.

In the present disclosure, for example, the bent state includes a first bending stage and a second bending stage. In the first bending stage, the display panel has a bending angle $\theta 1$; in the second bending stage, the display panel has a bending angle $\theta 2$; and $\theta 1$ is smaller than $\theta 2$. That is, in the first bending stage and in the second bending stage, the first flexible region has different bending degrees, and the same flexible sub-region of the first flexible region is in different bending conditions in the first bending stage and the second bending stage. For one supporting structure and one flexible sub-region corresponding to each other, in the first bending stage and the second bending stage, the vertical distance between the geometric center of the supporting surface and the first supporting plate changes with the change of the vertical distance between the geometric center of the flexible sub-region and the first supporting plate; and the vertical distance between the geometric center of the supporting surface and the first supporting plate in the first bending stage is different from that in the second bending stage. In an embodiment of the present disclosure, according to the different bending stages of the first flexible region, the supporting body of the supporting structure can provide the support with different heights for the corresponding flexible sub-region. In this way, at each of the different bending stages during the transition of the first flexible region from the flattened state to the folded state, the supporting structure can support the corresponding flexible sub-region, so as to ensure each position of the first flexible region to be effectively supported at different bending stages.

Figure 7:
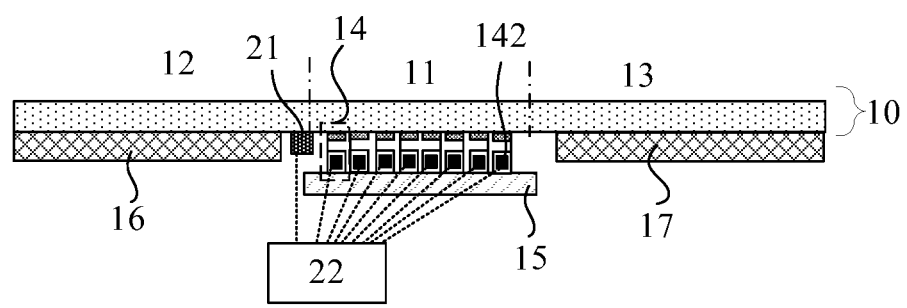
FIG. 7 is a schematic diagram of a flexible display device according to another embodiment of the present disclosure.

For example, in an embodiment, FIG. 7 is a schematic diagram of a flexible display device according to another embodiment of the present disclosure. As shown in FIG. 7, the flexible display device further includes a bending sensor 21 and a support-controlling unit 22 that are illustrates as blocks. The supporting structure 14 includes a micro processing unit 142 electrically connected to the support-controlling unit 22. That is, the micro processing unit 142 of each of the supporting structures 14 is electrically connected to the same support-controlling unit 22. In FIG. 7, the position where the bending sensor 21 is arranged is illustrative, not serving as a limitation of the present disclosure.

The bending sensor 21 is configured to sense the bending angle $\theta$ of the display panel 10 in the bent state, and transmit the sensed bending angle to the support-controlling unit 22. In other words, when the first flexible region 11 is bent, the bending sensor 21 can sense the bending angle $\theta$ of the display panel 10 in real time according to the bending stage of the first flexible region 11.

The support-controlling unit 22 is configured to search for a to-be-supported height of each supporting structure 14 in a preset first relationship table according to the sensed bending angle, and transmit the to-be-supported height to the micro processing unit 142 of each supporting structure 14, in which the preset first relationship table includes a correspondence relationship between the bending angle $\theta$ of the display panel and a supporting height of each supporting structure 14. The support-controlling unit 22 is equivalent to a main controller that can control all the supporting structures. The first preset relationship table is stored in the support-controlling unit 22. Supporting height data in the first preset relationship table are obtained through a large number of simulation experiments, which are data of height required to effectively support the flexible sub-region at the different bending angles of the display panel. In the preset first relationship table, one bending angle θ corresponds to a set of supporting height data, where one supporting height data corresponds to one supporting structure 14. For example, the bending angle θ of the display panel is in the range of 0°≤θ<180°, and the preset first relationship table includes a plurality of sets of corresponding data. During the simulation experiment, every time when the bending angle θ of the display panel is changed with a constant angle, the to-be-supported height of each supporting structure is measured to obtain a corresponding supporting height data. The constant angle of change can be any angle such as 1°, 2°, and 3°.

For example, the data in the preset first relationship table are obtained by measuring the to-be-supported height of each supporting structure every time when the bending angle θ of the display panel is changed with 2° as corresponding supporting height data. In practice, every time when the bending angle θ of the display panel is sensed to be changed with 2°, the bending sensor 21 sends the sensed bending result to the support-controlling unit 22. The support-controlling unit 22 searches for a corresponding to-be-supported heights in the preset first relationship table in response to the sensed bending result, and transmits the searched to-be-supported heights to the micro processing units of the supporting structure.

The micro processing unit 142 is further configured to control the supporting structure 14 to provide the corresponding flexible sub-region 111 with a height support according to the to-be-supported height.

The flexible display device according to the present embodiment is provided with the bending sensor and the support-controlling unit, and the support-controlling unit is connected to the micro processing units of all the supporting structures. The bending sensor can sense the bending angle of the display panel in real time, and transmit the sensed bending angle to the support-controlling unit. The support-controlling unit is pre-provided with a correspondence relationship table including a correspondence relationship between the bending angle and the supporting height of each supporting structure. The support-controlling unit can search for the to-be-supported height of each supporting structure in the table according to the bending angle, and then transmits the searched to-be-supported height to the corresponding micro processing unit. Then, the micro processing unit controls the supporting structure to provide the flexible sub-region with a height support, according to the to-be-supported height. By the preset first relationship table, once the bending angle of the display panel is sensed, the to-be-supported height of each supporting structure can be quickly searched and fed back to the micro processing unit of the corresponding supporting structure, thereby simplifying the data processing of the micro processing unit and accelerating the response of each supporting structure according to the state of the first flexible region.

For example, the supporting structure includes a height adjustment mechanism configured to adjust the vertical distance between the geometric center of the supporting surface and the first supporting plate. The height adjustment mechanism is connected to the micro processing unit, so as to adjust the vertical distance between the geometric center of the supporting surface of the supporting structure and the first supporting plate in response to the control of the micro processing unit. In an embodiment, the micro processing unit, once receiving the to-be-supported height from the support-controlling unit, controls the height adjustment mechanism according to the to-be-supported height, such that the supporting structure can provide the corresponding flexible sub-region with a height support.

Figure 8:
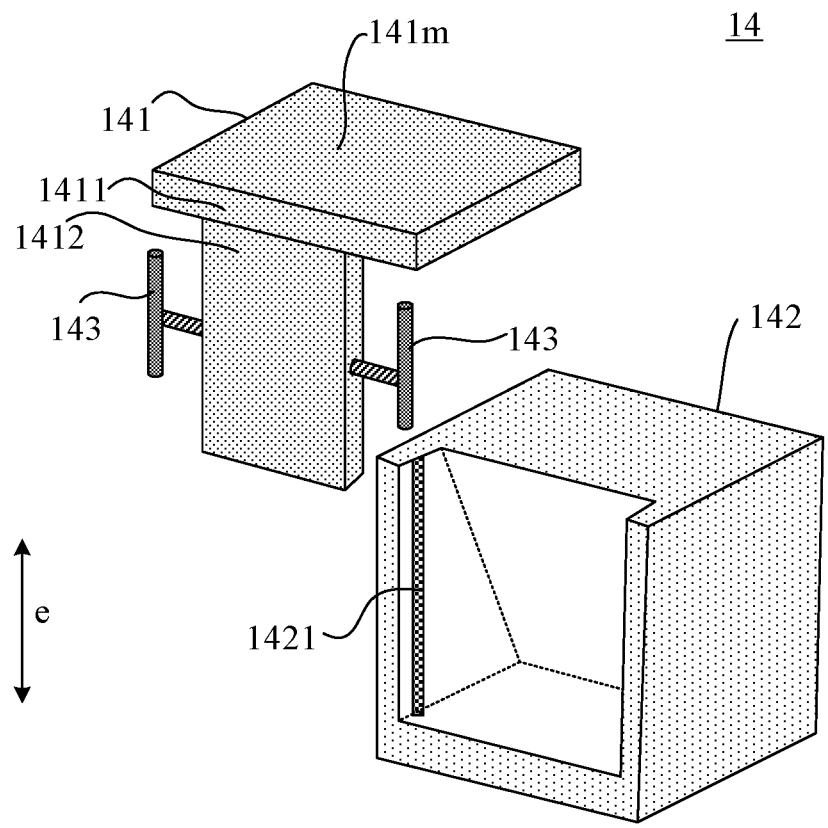
FIG. 8 is a schematic diagram of a disassembled supporting structure in a flexible display device provided by an embodiment of the present disclosure.

FIG. 8 is a schematic diagram of a disassembled supporting structure in a flexible display device provided by an embodiment of the present disclosure. As shown in FIG. 8, the supporting structure 14 includes a supporting body 141. The supporting body 141 includes a top portion 1411 and a side portion 1412, and the side portion 1412 is connected to the top portion 1411. The top portion 1411 includes the supporting surface 141*m*. In the flattened state, the top portion 1411 is parallel to the first supporting plate, and the side portion 1412 is perpendicular to the first supporting plate. In the drawing, the first supporting plate is not shown. The side portion 1412 can be connected to the top portion 1411 at an end of the top portion 1411. Alternatively, the side portion 1412 is connected to the top portion 1411 close to the central region of the top portion 1411, which is not specifically limited in the present disclosure.

The supporting structure 14 further includes a main body 142, and the main body 142 includes two sliding grooves 1421, only one of which is illustrated in the oblique view of the main body as shown in the drawing. In the flexible display device, the sliding grooves 1421 is extended in an extending direction perpendicular to the first supporting plate.

The height adjustment mechanism includes sliding columns 143 connected to both sides of the side portion 1412, respectively. The sliding columns 143 are engaged in the sliding grooves 1421, and slides in the sliding grooves 1421 to drive the supporting body 141 to move in a direction perpendicular to the first supporting plate, as indicated with direction e in the drawings.

The micro processing unit 142 is not shown in FIG. 8. In an embodiment, the micro processing unit 142 is arranged inside the main body 142, and the sliding columns 143 are connected to the micro processing unit 142. In response to the control of the micro processing unit 142, the sliding columns 143 drive the supporting body 141 to move in the direction perpendicular to the first supporting plate, so as to change the vertical distance between the supporting surface 141*m* and the first supporting plate. In this way, the supporting structure 14 can provide effective height support to the corresponding flexible sub-region according to the usage state of the first flexible region.

Figure 9:
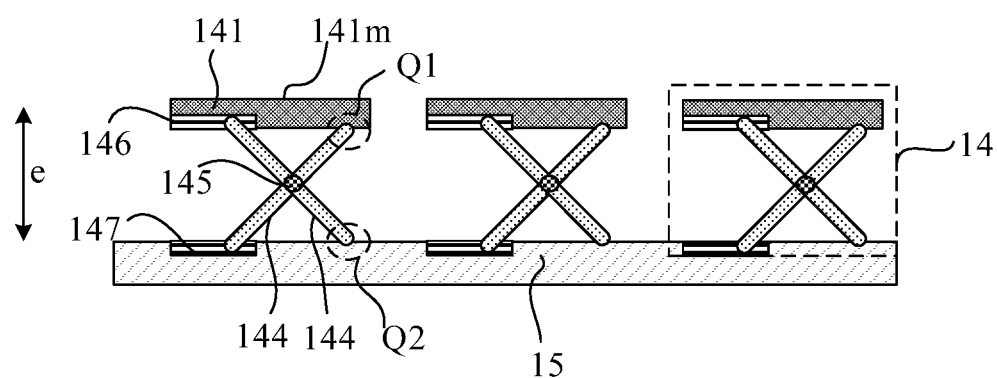
FIG. 9 is a schematic diagram of a supporting structure in a flexible display device according to another embodiment of the present disclosure.

FIG. 9 is a schematic diagram of a supporting structure in a flexible display device according to another embodiment of the present disclosure. As shown in FIG. 9, the height adjustment mechanism includes two adjusting members 144 that are relatively rotatable. The adjusting members are arranged to cross each other, and a pivoting member 145 sequentially penetrating the middles of the two adjusting members 144, such that the two adjusting members 144 can rotate relatively. A sliding groove 146 is provided in the supporting body 141, and a sliding groove 147 is provided in the first supporting plate 15. One adjustment member 144 of the height adjustment mechanism has one end fixedly connected to the supporting body 141 (at the position indicated with area Q1), and the other end engaged in the sliding groove 147; and the other adjustment member 144 of the height adjustment mechanism has one end fixedly connected to the first supporting plate 15 (at the position indicated by area Q2), and the other end is engaged with the sliding groove 146. By engaging and sliding the ends of the two adjusting members 144 in the sliding groove 146 and the sliding groove 147 respectively, the vertical distance between the supporting surface 141*m* of the supporting body 141 and the first supporting plate 15 can change. For example, the two adjusting members 144 are both connected to the micro processing unit (not shown in FIG. 9). In response to the control of the micro processing unit 142, the ends, engaged in the sliding groove 146 and the sliding groove 147, of the two adjusting members 144 slides in the sliding groove 146 and the sliding groove 147 respectively, so as to implement a change of the distance between the supporting surface 141m and the first supporting plate 15, for example, a change of the distance along the direction e between the supporting surface 141m and the first supporting plate 15 as illustrated. In this way, the supporting structures 14 provide effective height-support for the corresponding flexible sub-regions according to the usage state of the first flexible region.

Figure 10:
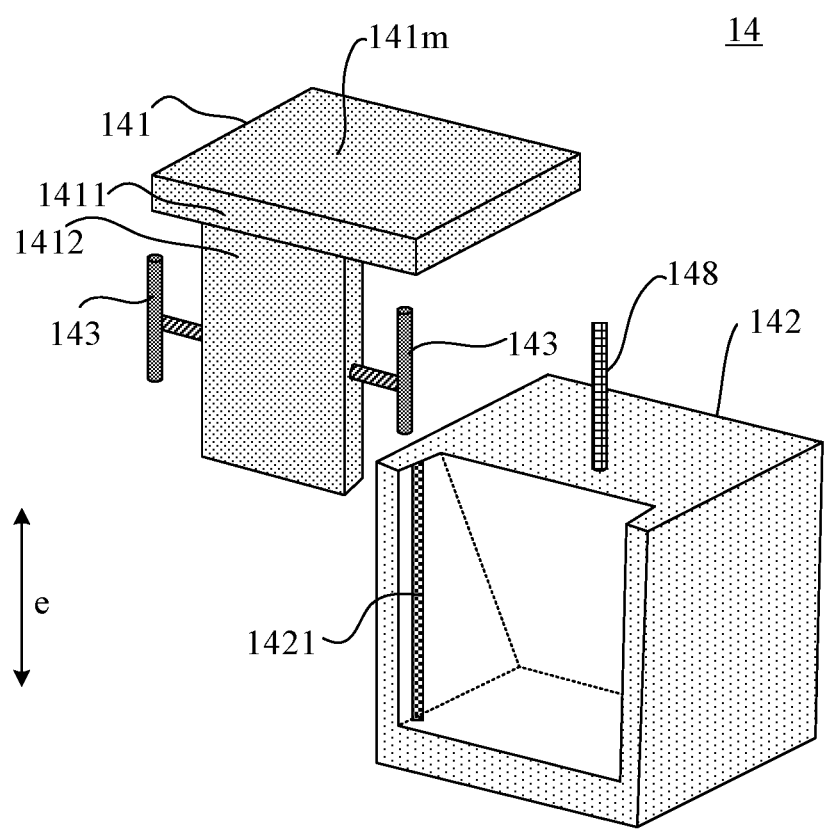
FIG. 10 is a schematic diagram of a dissembled supporting structure in a flexible display device according to another embodiment of the present disclosure.

FIG. 10 is a schematic diagram of a dissembled supporting structure in a flexible display device according to another embodiment of the present disclosure. As shown in FIG. 10, the supporting structure 14 includes a supporting body 141. The supporting body 141 includes a top portion 1411 and a side portion 1412 connected to the top portion 1411. The top portion 1411 includes the supporting surface 141m. In the flattened state, the top portion 1411 is parallel to the first supporting plate, and the side portion 1412 is perpendicular to the first supporting plate. The first supporting plate is not shown in FIG. 10.

The supporting structure 14 includes a main body 142 slidably connected to the side portion 1412. The side portion 1412 is slidable with respect to the main body 142 along a direction perpendicular to the first supporting plate. In an embodiment, a sliding connection mode between the side portion 1412 and the main body 142 is the same as that illustrated in FIG. 8. That is, sliding columns are provided at the both sides of the side portion, and sliding grooves are provided in the main body, and the sliding columns are engaged in the sliding groove to build the sliding connection between the side portion 1412 and the main body 142. The height adjustment mechanism includes a connecting rod 148 perpendicular to the first supporting plate. The connection rod 148 is configured to support the top portion 1411 along with the movement along the direction perpendicular to the first supporting plate. The movement direction of the connection rod is the direction e as illustrated in the drawing.

In an embodiment, the micro processing unit 142 is arranged inside the main body 142, and the connecting rod 148 is connected to the micro processing unit 142. In response to the control of the micro processing unit 142, the connecting rod 148 drives the supporting body 141 to move in the direction perpendicular to the first supporting plate, and drives the side portion 1412 of the supporting body 141 to slide with respect to the main body 142 in the meantime, thereby changing the vertical distance between the supporting surface 141m and the first supporting plate. In this way, the supporting structures 14 provide effective height-support for the corresponding flexible sub-regions according to the usage state of the first flexible region.

The preset first relationship table further includes a correspondence relationship between a bending angle θ of the display panel and the supporting angle of each supporting structure 14. The support-controlling unit 22 illustrated in the embodiment of FIG. 7 is further configured to search for to-be-supported angles of each supporting structures 14 in the preset first relationship table according to the sensed bending angle, and transmit the respective to-be-supported angles to the micro processing units 142 of corresponding supporting structures 14. The micro processing unit 142 is further configured to control the supporting structure 14 to provide an angled support to the corresponding flexible sub-region 111 according to the to-be-supported angle. The preset first relationship table includes supporting angle data, which are obtained through a large number of simulation experiments. The supporting angle data are data of angle required to effectively support the flexible sub-region at the different bending angles of the display panel. Referring to FIG. 4, when the supporting structure 14 supports the flexible sub-region 111 corresponding to this supporting structure 14, the vertical distance between the geometric center of the supporting surface 141m of the supporting body and the first supporting plate 15 changes with the change of the vertical distance between the geometric center of the flexible sub-region 111 and the first supporting plate 15, and meanwhile, the supporting surface 141m forms a certain inclination angle with respect to the first supporting plate 15. Thus, the supporting structure provides an angled support for the flexible sub-region 111, thereby supporting a state angle of the flexible sub-region when the first flexible region 11 is bent. The state angle can be understood as an inclination angle of the flexible sub-region with respect to the first supporting plate. Thus, the flexible sub-regions at different positions can all be effectively supported. In the present embodiment, the preset first relationship table is stored in the support-controlling unit, and the support-controlling unit performs a processing to feedback information about the to-be-supported heights and the to-be-supported angles to the micro processing units of supporting structures, thereby simplifying the data processing process of the micro processing unit, and shortening a responsive time of each supporting structure according to the usage state of the first flexible region.

For example, the supporting structure 14 further includes an angle adjustment mechanism configure to allow the supporting structure to provide an angled support for the corresponding flexible sub-region. The angle adjustment mechanism is connected to the micro processing unit. In response to the control of the micro processing unit, the angle adjustment mechanism adjusts an inclination angle of the supporting surface of the supporting structure with respect to the first supporting plate. In an embodiment, after receiving the to-be-supported angle data from the support-controlling unit, the micro processing unit controls the angle adjustment mechanism according to the to-be-supported angle data in such a manner that the supporting structure provides the angled support for the corresponding flexible sub-region.

Figure 11:
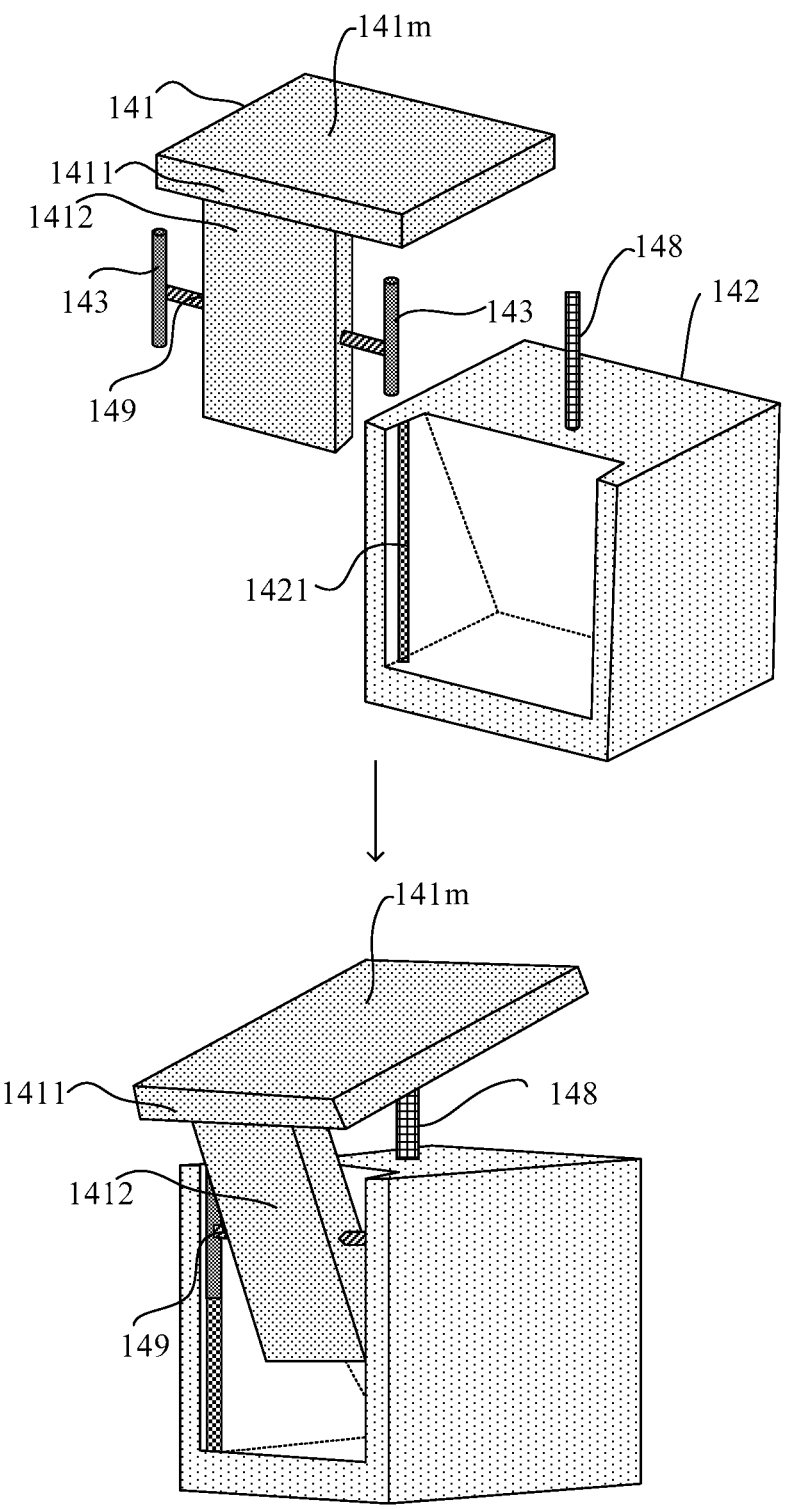
FIG. 11 is a schematic diagram of a supporting structure in a flexible display device according to another embodiment of the present disclosure.

FIG. 11 is a schematic diagram of a supporting structure in a flexible display device according to another embodiment of the present disclosure. As shown in FIG. 11, the supporting structure 14 includes a supporting body 141. The supporting body 141 includes a top portion 1411 and a side portion 1412 connected to the top portion 1411, and the top portion 1411 includes the supporting surface 141m. In the flattened state, the top portion 1411 is parallel to the first supporting plate, the side portion 1412 is perpendicular to the first supporting plate. The first supporting plate is not shown in FIG. 11. The supporting structure 14 further includes a rotation shaft 149. In the flexible display device, the rotation shaft 149 is parallel to the first supporting plate. The side portion 1412 is rotationally connected to the rotation shaft 149. The angle adjustment mechanism (not shown) is configured to control the side portion 1412 to rotate about the rotation shaft 149. The side portion 1412 rotates about the rotation shaft 149 to drive the top portion 1411 to move. Then, the supporting surface 141m of the top portion 1411 can form a certain inclination angle with respect to the first supporting plate, thereby changing the angle of the supporting surface 141*m* with respect to the first supporting plate. The inclination angle formed by controlling the supporting surface 141*m* with respect to the first supporting plate is approximately the same as the inclination angle of the flexible sub-region with respect to the first supporting plate when the first flexible region 11 is bent. Thus, the supporting surface 141*m* can still contact and support the flexible sub-region even when the flexible sub-region is bent, thereby ensuring the effective support of the supporting structure to the flexible sub-region.

FIG. 11 also illustrates a connecting rod 148 configured to support the top portion 1411 to move along the direction perpendicular to the first supporting plate. Therefore, the supporting structure 14 can provide the height support for the flexible sub-region by the connecting rod 148. In addition, when the supporting structure 14 provides the angled support for the flexible sub-region, the connecting rod 148 can support the top portion 1411 to ensure the stability of the angle support.

Figure 12:
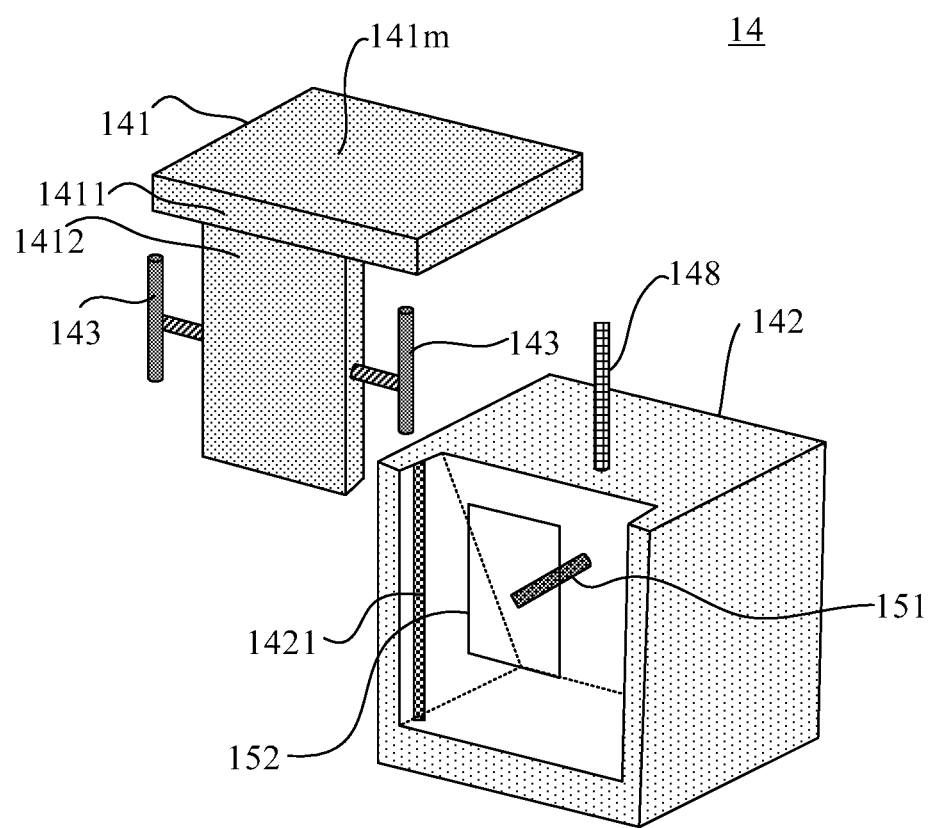
FIG. 12 is a schematic diagram of a dissembled supporting structure in a flexible display device according to another embodiment of the present disclosure.

FIG. 12 is a schematic diagram of a dissembled supporting structure in a flexible display device according to another embodiment of the present disclosure. As shown in FIG. 12, the angle adjustment mechanism includes an elastic member 151 and a connecting block 152 connected to the elastic member 151. The elastic member 151 is configured to apply elastic force to the connecting block 152. The connecting block 152 is configured to transmit the elastic force to the side portion 1412, so as to control the side portion 1412 to rotate about the rotation shaft 149. The elastic member 151 is connected to the micro processing unit (not shown). The elastic member 151, in response to the control of the micro processing unit, applies the elastic force to the connecting block 152, and the connecting block 152 transmits the elastic force to the side portion 1412. Thus, the side portion 1412 rotates about the rotation shaft 149 and drives the top portion 1411 to incline with respect to the first supporting plate with a certain inclination angle. In an embodiment, after receiving the to-be-supported angle data from the support-controlling unit, the micro processing unit controls the elastic member according to the to-be-supported angle data, to allow the supporting structure to provide the angle support for the corresponding flexible sub-region.

Figure 13:
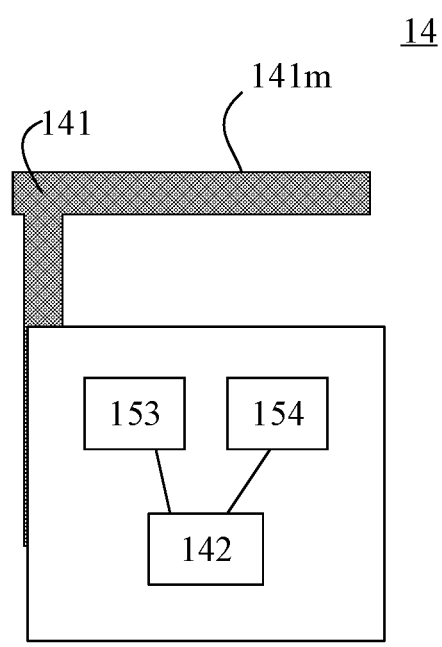
FIG. 13 is a schematic diagram of a supporting structure in a flexible display device according to another embodiment of the present disclosure.

FIG. 13 is a schematic diagram of a supporting structure in a flexible display device according to another embodiment of the present disclosure. As shown in FIG. 13, the supporting structure 14 further includes a height sensor 153 and a micro processing unit 142. The height sensor 153 is configured to sense the vertical distance between the geometric center of the flexible sub-region 111 and the first supporting plate 15 and transmit the sensed vertical distance to the micro processing unit 142. Accordingly, when the vertical distance between another position of the flexible sub-region and the first supporting plate 15 is adopted to reflect the state of the flexible sub-region, the height sensor 153 is configured to sense the vertical distance between another position of the flexible sub-region and the first supporting plate 15. When the vertical distances between multiple positions of the flexible sub-region and the first supporting plate 15 are adopted to reflect the state of the flexible sub-region, the height sensor 153 is configured to sense the vertical distances between the multiple positions of the flexible sub-region and the first supporting plate 15. The position where the height sensor is arranged is not specifically limited in the present embodiments of the present disclosure. The micro processing unit 142 is configured to obtain a to-be-supported height according to the sensed vertical distance, and further configured to control the supporting structure 14 to provide the corresponding flexible sub-region 111 with a height support according the to-be-supported height. In the present embodiment, each of the supporting structures is provided with the height sensor and the micro processing unit, and thus each of the supporting structures can accurately sense the vertical distance between the geometric center of the corresponding flexible sub-region and the first supporting plate with its own height sensor, so as to provide the accurate and effective height support for each flexible sub-region.

For example, in the embodiment of FIG. 13, the supporting structure further includes a height adjustment mechanism. The height adjustment mechanism adjusts the vertical distance between the geometric center of the supporting surface of the supporting structure and the first supporting plate in the same way as described in the embodiments with reference to FIG. 8 to FIG. 10. In the embodiment of FIG. 13, the height adjustment mechanism is connected to the micro processing unit, the micro processing unit controls the height adjustment mechanism according to the feedback of the height sensor, so as to realize the height support of the supporting structure to the corresponding flexible sub-region.

Further referring to FIG. 13, the supporting structure 14 further includes an angle sensor 154 configured to sense a state angle of the flexible sub-region corresponding to the supporting structure 14 in the bent state of the display panel and transmit the sensed state angle to the micro processing unit 142. The state angle is an angle between the flexible sub-region 111 and the first supporting plate 15. The state angle is an inclination angle of the flexible sub-region 111 with respect to the first supporting plate 15 when the first flexible region 11 is bent. In the bent state of the first flexible region 11, the flexible sub-regions 111 at different positions have different inclination angles with respect to the first supporting plate 15. The micro processing unit is configured to search for a to-be-supported angle in a preset second relationship table according to the sensed state angle, and further configured to control the supporting structure 14 to provide an angled support for the corresponding flexible sub-region 111 according to the to-be-supported angle. The preset second relationship table includes a correspondence relationship between the state angle of the flexible sub-region 111 and a supporting angle of the supporting structure 14. Supporting angle data in the second preset relationship table are obtained through a large number of simulation experiments, which are data of angle required to effectively support the flexible sub-regions at the different bent states of the first flexible region. The preset second relationship table is stored in the support-controlling unit. The micro processing unit searches for the corresponding to-be-supported angle information in the preset second relationship table according to the feedback of the angle sensor, and controls the supporting structure to provide the angled support. In the present embodiment, each of the supporting structures can provide effective angled support for the corresponding flexible sub-region based on feedback from its own angle sensor, thereby ensuring the accuracy of the angled support.

For example, in the embodiment of FIG. 13, the supporting structure further includes an angle adjustment mechanism configure to allow the supporting structure to provide an angled support for the corresponding flexible sub-region. The angled support of the supporting structure achieved by the angle adjustment mechanism is the same as that described in the embodiment with reference to FIG. 11 or FIG. 12. In the embodiment of FIG. 13, the angle adjustment mechanism is connected to the micro processing unit. The micro processing unit controls the angle adjustment mechanism according to the feedback of the angle sensor, so as to realize the angled support of the supporting structure to the corresponding flexible sub-region.

Figure 14:
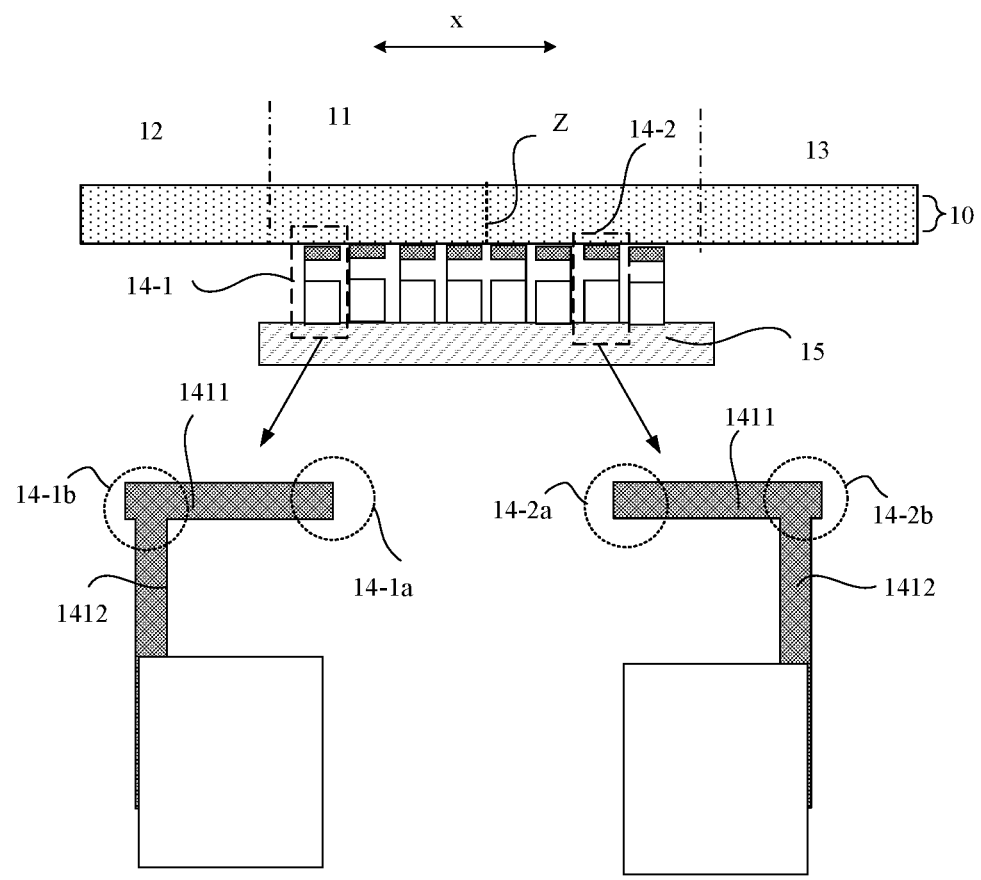
FIG. 14 is a schematic diagram of a flexible display device according to another embodiment of the present disclosure.

FIG. 14 is a schematic diagram of a flexible display device according to yet another embodiment of the present disclosure. As shown in FIG. 14, the first flexible region 11 has a virtual bending axis Z. In the flattened state, the virtual bending axis Z and the first direction x are perpendicular to each other. An intersection line (not labeled) of a plane of the side portion 1412 of the supporting structure 14 and a plane of the top portion 1411 is parallel to the virtual bending axis Z. In the schematic cross-sectional view of the flexible display device, the second region 12, the first flexible region 11, and the third region 13 are arranged in the first direction x, and an extension direction of the virtual bending axis Z is a direction perpendicular to the paper surface. The intersection line of the plane of the side portion 1412 of the supporting structure 14 and the plane of the top portion 1411 is also perpendicular to the paper surface. When the first flexible region 11 is bent along the virtual bending axis Z, a certain bending angle θ of the display panel is formed. By setting the intersection line of the plane of the side portion 1412 of the supporting structure 14 and the plane of the top portion 1411 to be parallel to the virtual bending axis Z, the side portion 1412 rotates about the rotation shaft (as shown in FIG. 11), so as to drive the top portion 1411 to form a certain inclination angle with respect to the first supporting plate 15, which is conducive to adapting the supporting structure 14 to the bent state of the first flexible region 11 and to provide the angle support for the corresponding flexible sub-region.

Further referring to FIG. 14, the supporting structure includes first supporting structures 14-1 and second supporting structures 14-2. The first supporting structures 14-1 and the second supporting structures 14-2 are respectively located at two sides of the virtual bending axis Z in the first direction x. The top portion 1411 of the first supporting structure 14-1 has a first end 14-1a close to the virtual bending axis Z and a second end 14-1b facing away from the virtual bending axis Z. The side portion 1412 of the first supporting structure 14-1 is connected to the top portion 1411 at the second end 14-1b. The top portion 1411 of the second supporting structure 14-2 has a third end 14-2a close to the virtual bending axis Z and a fourth end 14-2b facing away from the virtual bending axis Z. The side portion 1412 of the second supporting structure 14-2 is connected to the top portion 1411 at the fourth end 14-2b. When the first flexible region is bent along the virtual bending axis, an inclination direction of the first flexible regions at the left side of the virtual bending axis with respect to the first supporting plate is opposite to that of the first flexible regions at the right side of the virtual bending axis. By providing to two types of supporting structures, it is ensured that the side portions of the supporting structures located at the left and right sides of the virtual bending axis rotate about the rotation shafts to drive the top portions to move. In this way, when a certain inclination angle is formed between the top portion and the first supporting plate, the side portion is provided with a sufficient rotation space. Through reasonable design, the supporting structure provides the angled support for the flexible sub-region, and occupies the smallest length in the first direction, allowing more the supporting structures to be arranged in the first direction. Thus, the first flexible region can be divided into more flexible sub-regions in the first direction, and each supporting structure can provide the height and angled supports for the flexible sub-region having a smaller area, so as to ensure that the first flexible region in the usage state can be accurately and effectively supported at each position.

Figure 15:
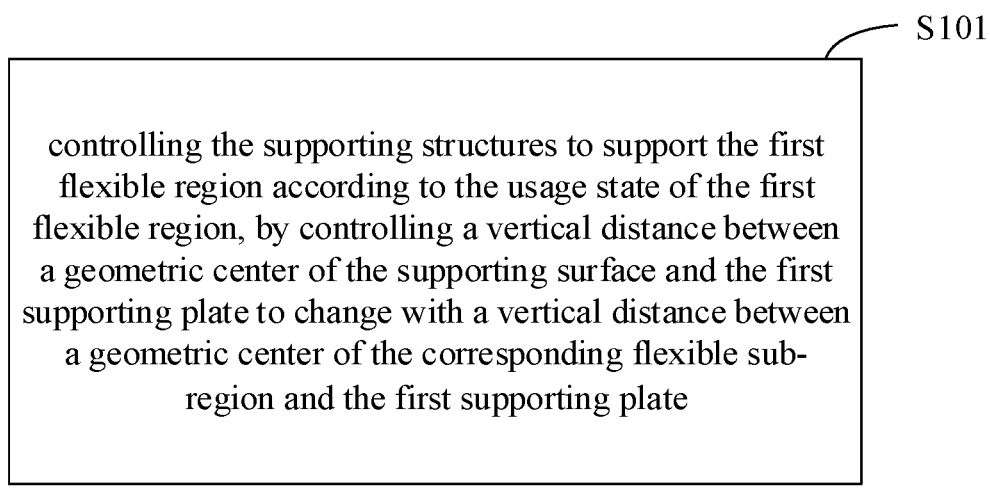
FIG. 15 is a flowchart of a control method of a flexible display device according to an embodiment of the present disclosure.

Further, a control method of a flexible display device is provided according to an embodiment of the present disclosure. The control method is suitable for controlling the above-mentioned foldable flexible display device. The structure of the flexible display device can be referred to any embodiment shown as the FIG. 1 to FIG. 14. The flexible display device includes: a display panel 10, the display panel 10 including a first flexible region 11, a second region 12 and a third region 13, the first flexible region 11 being divided into a plurality of flexible sub-regions 111; a plurality of supporting structure 14, one supporting structure 14 corresponding to one flexible sub-region 111, and each supporting structure including a supporting body 141, the supporting body 141 including a supporting surface 141m close to the corresponding flexible sub-region 111; and a first supporting plate 15 configured to support the plurality of supporting structures 14. The first flexible region has two usage states including a flattened state or a bent state. In the flattened state, the second region 12, the first flexible region 11, and the third region 13 are sequentially arranged in a first direction. In the bent state, the first flexible region 11 is bent; the display panel 10 has a bending angle θ satisfying $0° \leq θ < 180°$, and the bending angle θ is an angle included between the second region 12 and the third region 13. FIG. 15 is a flowchart of a control method of a flexible display device according to an embodiment of the present disclosure. As shown in FIG. 15, the control method includes the following steps.

Step S101: the plurality of supporting structures 14 is controlled to support the first flexible region 11 according to the usage state of the first flexible region 11. The step S101 may include: controlling a vertical distance between a geometric center of the supporting surface 141m and the first supporting plate 15 to change with a vertical distance between a geometric center of the corresponding flexible sub-region 111 and the first supporting plate 15. In the bent state or in the flattened state of the first flexible region 11, the description regarding the support of the supporting structure 14 for the first flexible region can be referred to the embodiment shown in FIG. 4, which is not repeated herein.

In the control method according to an embodiment of the present disclosure, the vertical distance between the geometric center of the supporting surface of the supporting structure and the first supporting plate is controlled to change with the vertical distance between the geometric center of the corresponding flexible sub-region and the first supporting plate, to ensure that each flexible sub-region can be effectively supported when the first flexible region is in the flattened state or at different bending stage of the bent state. In this way, the plurality of supporting structures can support the first flexible region according to the usage state of the first flexible region, thereby improving the user experience, overcoming the problems that the flexible region in the flattened state has creases, dents or bulges formed after multiple times of bending, and improving the service life of the flexible display device.

For example, the vertical distance between the geometric center of the supporting surface 141m and the first supporting plate 15 is controlled to change with the vertical distance between the geometric center of the corresponding flexible sub-region 111 and the first supporting plate 15, by controlling the vertical distance between the geometric center of the supporting surface 141m and the first supporting plate 15 to be positively correlated with the vertical distance between the geometric center of the corresponding flexible sub-region 111 and the first supporting plate 15. In other words, with an increase in the vertical distance between the geometric center of the flexible sub-region 111 and the first supporting plate 15, the vertical distance between the geometric center of the supporting surface 141m and the first supporting plate 15 is controlled to increase; and accordingly, with a decrease in the vertical distance between the geometric center of the flexible sub-region 111 and the first supporting plate 15, the vertical distance between the geometric center of the supporting surface 141m and the first supporting plate 15 is controlled to decrease. In this way, each supporting structure can support the corresponding first flexible sub-region according to the usage state of the first flexible region, and the first flexible region can be effectively supported at each position.

For example, the bent state includes a first bending stage and a second bending stage. In first bending stage, the display panel has a bending angle θ1; and in the second bending stage, the display panel has a bending angle θ2, where θ1<θ2. The control method further includes the following steps.

In the first bending stage and the second bending stage, the vertical distance between the geometric center of the supporting surface 141m and the first supporting plate 15 is controlled to change with the vertical distance between the geometric center of the corresponding flexible sub-region 111 and the first supporting plate 15. The vertical distance between the geometric center of the supporting surface 141m and the first supporting plate 15 in the first bending stage is different from that in the second stage.

In the control method according to an embodiment of the present disclosure, according to the different bending stages of the first flexible region, the supporting body of the supporting structure is controlled to provide a support with different heights for the corresponding flexible sub-region. Thus, at different bending stages during the transition of the first flexible region from the flattened state to the bent state, the supporting structure can support the corresponding flexible sub-region, so as to ensure each position of the first flexible region to be effectively supported at different bending stages.

Figure 16:
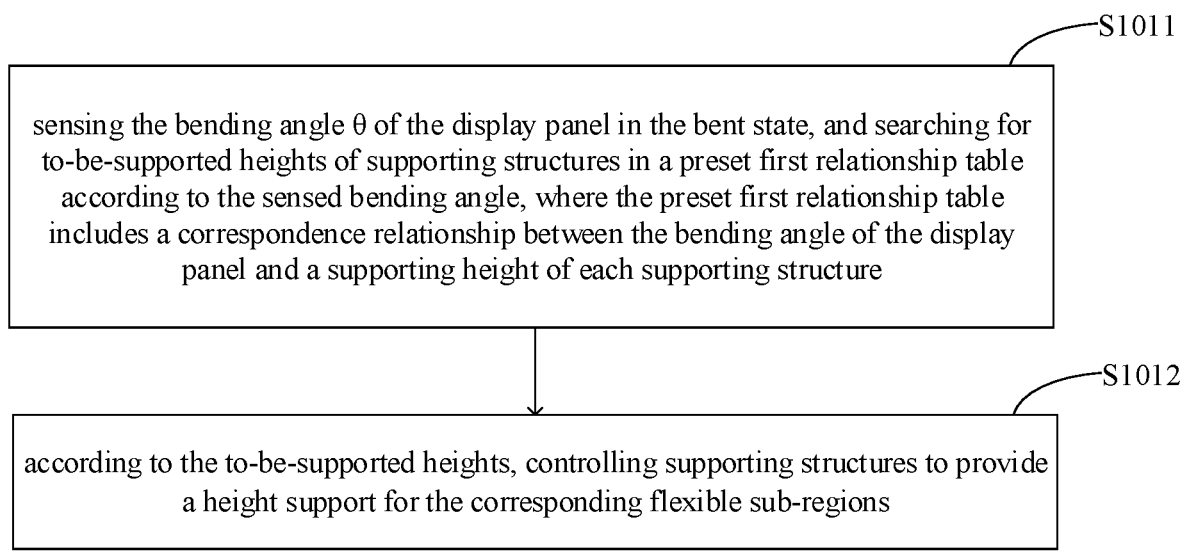
FIG. 16 is a flowchart of a control method of a flexible display device according to another embodiment of the present disclosure.

FIG. 16 is a flowchart of a control method of a flexible display device according to another embodiment of the present disclosure. As shown in FIG. 16, the Step S101 of controlling the vertical distance between the geometric center of the supporting surface and the first supporting plate to change with the vertical distance between the geometric center of the corresponding flexible sub-region and the first supporting plate includes the following steps.

Step 1011: the bending angle θ of the display panel 10 in the bent state is sensed, to-be-supported heights of supporting structures 14 are searched for in a preset first relationship table according to the sensed bending angle, in which the preset first relationship table includes a correspondence relationship between the bending angle θ of the display panel 10 and a supporting height of each supporting structure 14.

Step 1012: the supporting structures are controlled to provide a height support for the corresponding flexible sub-regions according to the to-be-supported heights.

For example, the control method according to the embodiment of the present disclosure can be applied to control the flexible display device in the embodiment shown in FIG. 7. The flexible display device is provided with the bending sensor and the support-controlling unit. The bending angle θ of the display panel in the bent state is sensed by the bending sensor. The preset first relationship table is stored in the support-controlling unit, and supporting height data in the preset first relationship table are obtained through a large number of simulation experiments, which are data of heights required to effectively support the flexible sub-regions at the different bending angles of the display panel. By presetting the preset first relationship table, the to-be-supported height of each supporting structure can be quickly found once the bending angle of the display panel is sensed, so as to control the supporting structure to provide the corresponding flexible sub-region with a height support according to the to-be-supported height. In this way, the supporting data processing can be simplified, and the response time for each supporting structure to support the first flexible region according to the usage state of the first flexible region is accelerated.

Figure 17:
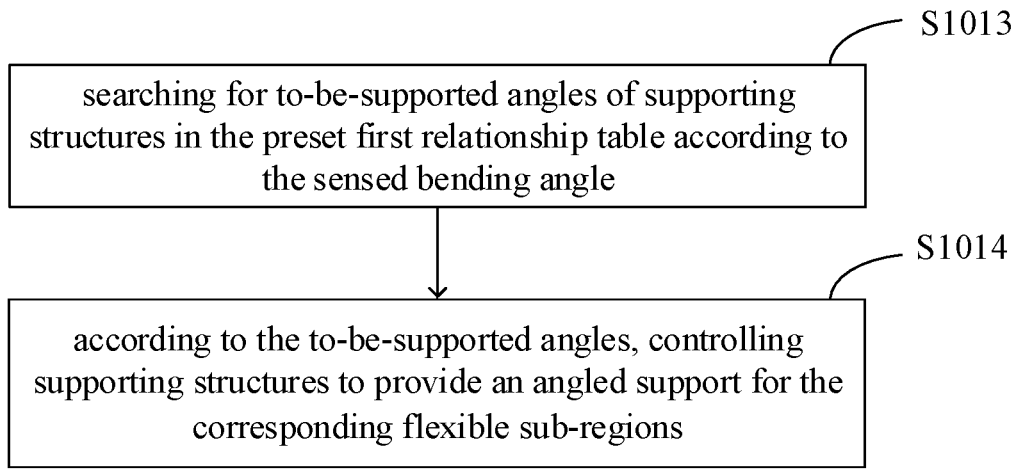
FIG. 17 is a flowchart of a control method of a flexible display device according to another embodiment of the present disclosure.

The preset first relationship table further includes a correspondence relationship between a bending angle θ of the display panel and the supporting angles of respective supporting structures. FIG. 17 is a flowchart of a control method of a flexible display device according to another embodiment of the present disclosure. As shown in FIG. 17, the control method further includes the following steps.

Step 1013: to-be-supported angles of supporting structures 14 are searched for in the preset first relationship table according to the sensed bending angle. The preset first relationship table includes supporting angle data. The supporting angle data are obtained through a large number of simulation experiments, which are data of angles required to effectively support the flexible sub-regions at the different bending angles of the display panel.

Step 1014: the supporting structures are controlled to provide an angled support for the corresponding flexible sub-regions according to the to-be-supported angles.

In the control method according to the embodiment of the present disclosure, the to-be-supported height and the to-be-supported angle of the supporting structure are searched for once the bending angle of the display panel is sensed, so as to control the supporting structure to provide the corresponding flexible sub-region with the height support and the angled support at the same time. In this way, the flexible sub-regions at different positions can be effectively supported. In addition, by presetting the preset first relationship table, the analysis and processing of the to-be-supported data after the bending angle is sensed can be simplified, and the response time for each supporting structure to support the first flexible region according to the state usage of the first flexible region can be accelerated.

Figure 18:
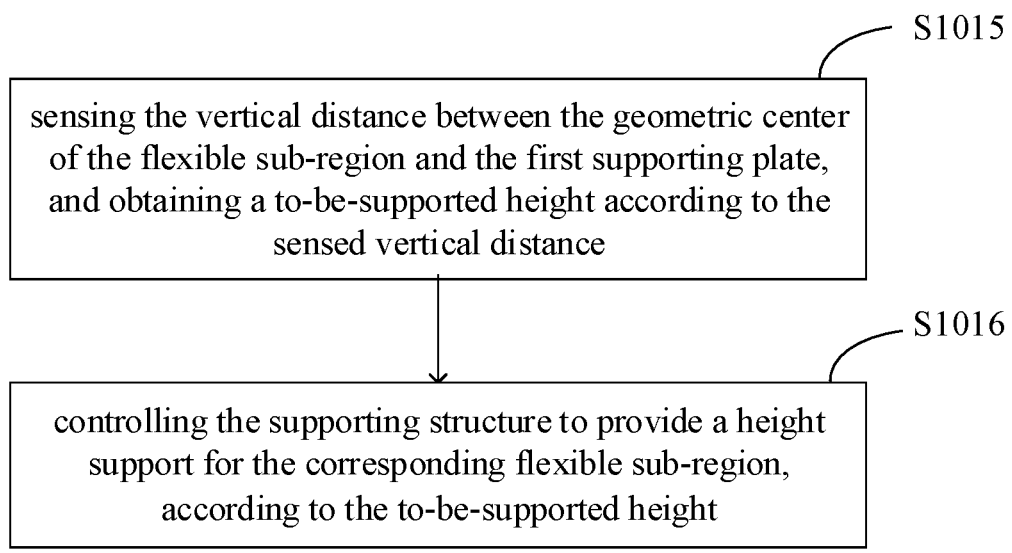
FIG. 18 is a flowchart of a control method of a flexible display device according to another embodiment of the present disclosure.

FIG. 18 is a flowchart of a control method of a flexible display device according to another embodiment of the present disclosure. As shown in FIG. 18, the controlling the vertical distance between the geometric center of the supporting surface 141m and the first supporting plate 15 to change with the vertical distance between the geometric center of the corresponding flexible sub-region 111 and the first supporting plate 15 includes the following steps.

Step 1015: the vertical distance between the geometric center of the flexible sub-region 111 and the first supporting plate 15 is sensed, and the to-be-supported height is obtained according the sensed vertical distance.

Step 1016: the supporting structure 14 is controlled to provide the corresponding flexible sub-region 111 with the height support, according to the to-be-supported height.

The control method according to the embodiment of the present disclosure can be applied to control the flexible display device in the embodiment shown in FIG. 13, in which each supporting structure is provided with a height sensor and a micro processing unit. The height sensor is configured to sense the vertical distance between the geometric center of the flexible sub-region and the first supporting plate, and the micro processing unit is configured to control the height support of the supporting structure according to the sensed vertical distance. In the present embodiment, the vertical distance between the first supporting plate and the geometric center of the flexible sub-region corresponding to each supporting structure can be sensed accurately under the control, so as to accurately and effectively provide each flexible sub-region with the height support.

Figure 19:
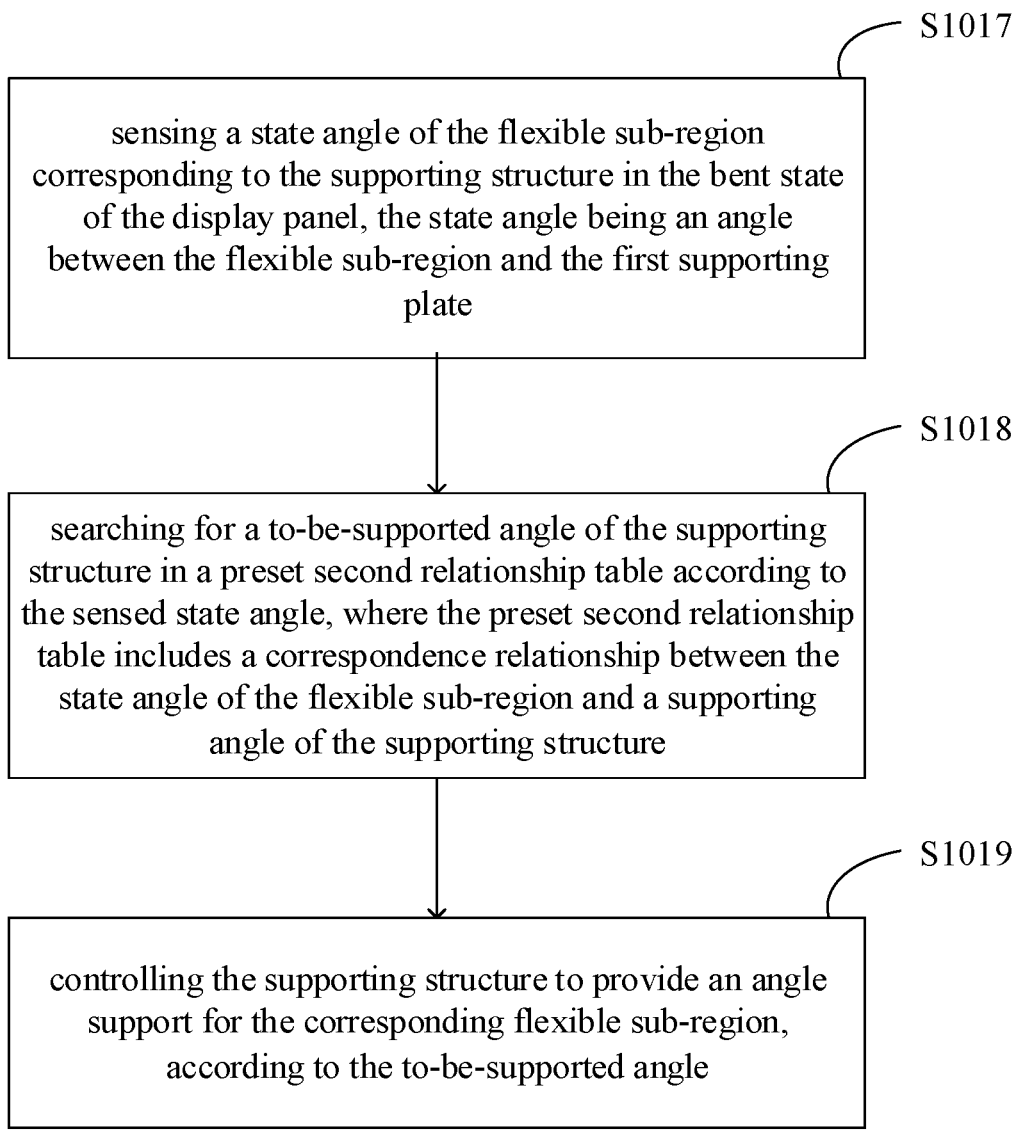
FIG. 19 is a flowchart of a control method of a flexible display device according to another embodiment of the present disclosure.

Further, FIG. 19 is a flowchart of a control method of a flexible display device according to another embodiment of the present disclosure. As shown in FIG. 19, the control method includes the following steps.

Step 1017: in the bent state of the display panel 10, a state angle of the flexible sub-region 111 corresponding to the supporting structure 14 is sensed. The state angle is an angle included between the flexible sub-region 111 and the first supporting plate 15. That is, the state angle is an inclination angle of the flexible sub-region 111 with respect to first supporting plate 15 when the first flexible region 11 is bent. In the bent state of the first flexible region 11, the flexible sub-regions 111 at different positions form different inclination angles with respect to the first supporting plate 15.

Step 1018: the to-be-supported angle is searched for in the preset second relationship table, according to the sensed state angle. The preset second relationship table includes a correspondence relationship between the state angle of the flexible sub-region 111 and the supporting angle of the supporting structure 14. The supporting angle data in the preset second relationship table are obtained through a large number of simulation experiments, which are data of angle required to effectively support the flexible sub-region at the different bending stages of the first flexible region.

Step 1019: the supporting structure 14 is controlled to provide the angled support for the corresponding flexible sub-region 111, according to the to-be-supported angle.

In the present embodiment, the state angle of the flexible sub-region is first sensed, and the to-be-supported angle is searched for in the preset second relationship table according to the sensed state angle, then each supporting structure is controlled to provide the angled support for the corresponding flexible sub-region according to the to-be-supported angle, thereby guaranteeing the accuracy of the angled support.

The foldable flexible display device and the control method thereof provided by the embodiments of the present disclosure are described in the above embodiments. A pull-type flexible display device and a control method thereof provided by an embodiment of the present disclosure are described below.

Figure 20:
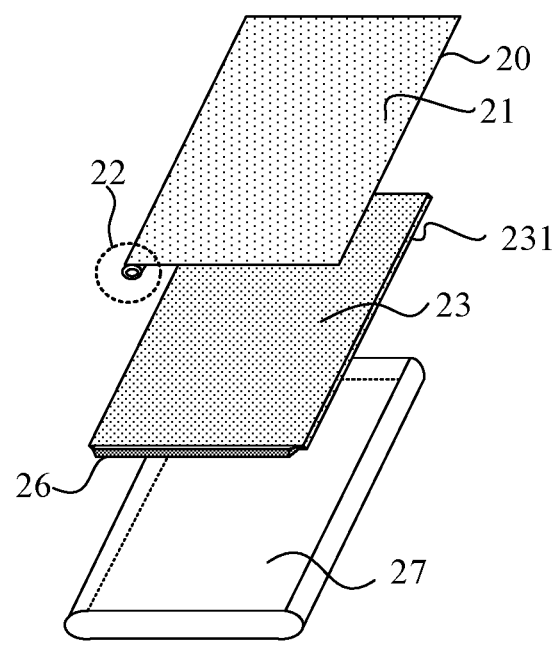
FIG. 20 is a schematic diagram of a dissembled flexible display device according to an embodiment of the present disclosure.
Figure 21:
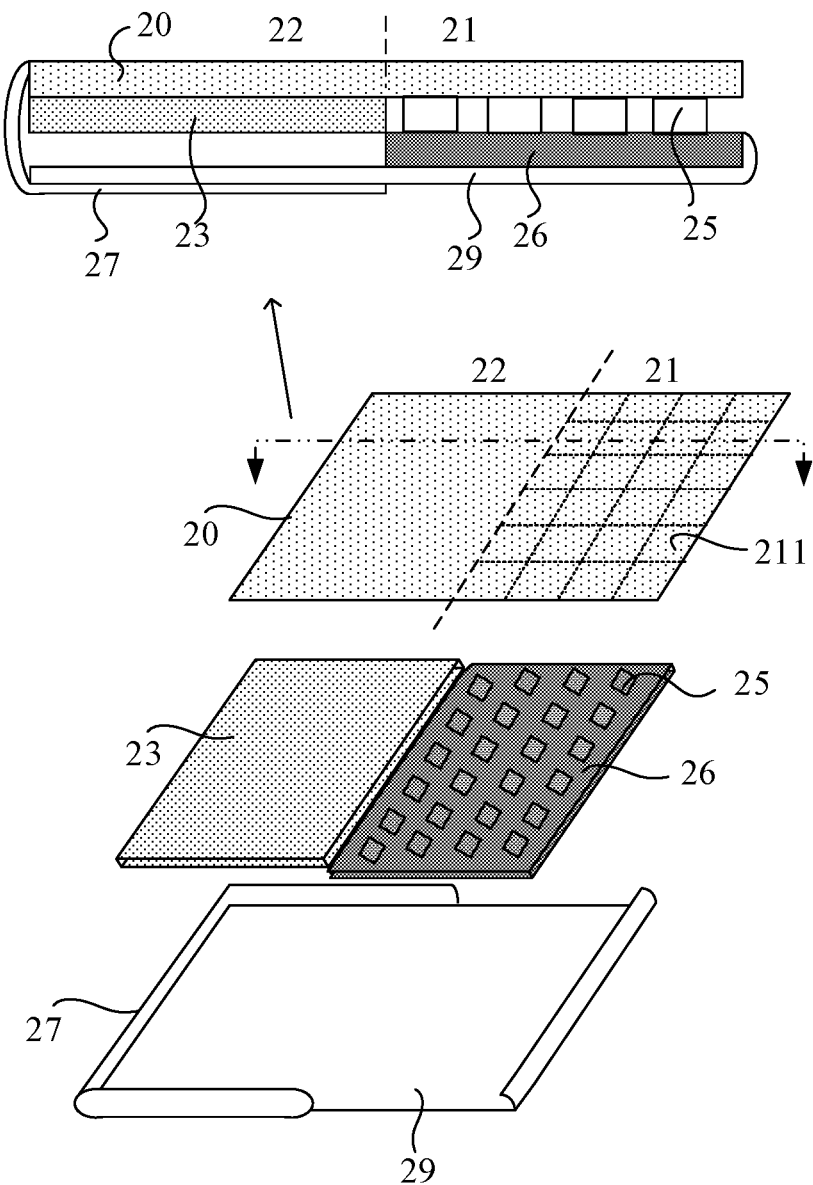
FIG. 21 is a schematic diagram of a flexible display device according to another embodiment of the present disclosure.

FIG. 20 is a schematic diagram of a dissembled flexible display device according to an embodiment of the present disclosure, and FIG. 21 is a schematic diagram of a flexible display device according to another embodiment of the present disclosure.

Referring to both of FIG. 20 and FIG. 21, the flexible display device includes a display panel 20, the display panel 20 includes a first flexible region 21, and a second flexible region 22 connected to the first flexible region 21. The first flexible region 21 is divided into a plurality of flexible sub-regions 211. The first flexible region 21 has two usage states including a pull-out state and an undrawn state.

The flexible display device includes a main supporting plate 23 and a receiving cabin; a plurality of supporting structures 25, one supporting structure corresponding to one flexible sub-region 211; and a first supporting plate 26 configured to support the plurality of supporting structures 25.

FIG. 20 is a schematic diagram of the first flexible region 21 in the undrawn state. In the undrawn state, the main supporting plate 23 supports the first flexible region 21, and the first supporting plate 26 overlaps with the main supporting plate 23. The first supporting plate 26 and the plurality of supporting structures (not shown in FIG. 20) are all located on a side of the main supporting plate 23 facing away from the first flexible region 21. The second flexible region 22 is received in the receiving cabin. The figures also illustrate a protective housing 27 of the flexible display device. In an embodiment, the protective housing 27 serves as the receiving cabin for receiving the second flexible region 22. In another embodiment, an independent space isolated from other element is provided in the protective housing 27, and serves as the receiving cabin for receiving the second flexible region 22. The undrawn state of the first flexible region 21 is a retracted state of the second flexible region 22.

FIG. 21 illustrates a schematic diagram of a first flexible region 21 in a pull-out state and a cross-sectional view of the flexible display device. In the pull-out state, a displacement occurs between the first flexible region 21 and the main supporting plate 23. At least a part of the second flexible region 22 is pulled out of the receiving cabin with the displacement of the first flexible region 21, and the pull-out part of the second flexible region 22 is supported by the main supporting plate 23. Meanwhile, a displacement occurs between the first supporting plate 26 and the main supporting plate 23, the supporting structure 25 supports the flexible sub-region 211 corresponding to the supporting structure 25 with the displacement of the first flexible region 21. FIG. 21 further illustrates that the first flexible region 21 is divided into the plurality of flexible sub-regions 211, and one flexible sub-region 211 corresponds to one supporting structure 25. FIG. 21 illustrates that the flexible display device further includes a protective plate 29. In the pull-out state of the first flexible region 21, a displacement occurs between the first supporting plate 26 and the main supporting plate 23. Meanwhile, the protective plate 29 is also in the pull-out state and configured to support and protect the first supporting plate 26. The pull-out state of the first flexible region 21 corresponds to a flattened state of the second flexible region 22.

For the pull-type flexible display device, when the first flexible region is in the pull-out state, the second flexible region is pulled out of the receiving cabin with the displacement of the first flexible region, to allow the first flexible region and the second flexible region together to be used for display, thereby increasing the display area. In the pull-out state of the first flexible region, the flatness of the first flexible region, due to the flexibility thereof, may be affected in absence of the supporting members, which affects the user experience. In an embodiment of the present disclosure, when the first flexible region is in the pull-out state, a displacement of the first supporting plate with respect to the main supporting plate occurs, and thus the supporting structures supported by the first supporting plate can support the flexible sub-regions corresponding to these supporting structures along with the displacement of the first flexible region. Meanwhile, the second flexible region pulled out of the receiving cabin is supported by the main supporting plate. By providing the supporting structure and the first supporting plate, the first flexible region can be effectively supported even in the pull-out state, guaranteeing the flatness of the first flexible region when the first flexible region and the second flexible region are together used for display, thereby improving user experience. In addition, when the first flexible region in the pull-out state is supported with the supporting structures, the functions of the first flexible region, such as touch function, can be advantageously achieved in the pull-out state.

Further, the flexible display device includes a position sensor and a position processing unit. The supporting structure includes a micro processing unit, and the micro processing unit is electrically connected to the position processing unit. The position sensor is configured to sense a displacement position of the first flexible region 21 in the pull-out state to obtain position information, and transmit the position information to the position processing unit. In an embodiment, the position sensor can be provided at an end 231 of the main supporting plate 23 shown in FIG. 20. The location processing unit is configured to determine the to-be-controlled supporting structure among the plurality of supporting structures 25 according to the position information and transmit a control instruction to the corresponding micro processing unit to control the to-be-controlled supporting structure.

In an embodiment of the present disclosure, the first flexible region 21 is divided into a plurality of flexible sub-regions 211, and one flexible sub-region 211 corresponds to one supporting structure 25. In the micro processing unit, position information on coordinates of each flexible sub-region 211 on the display panel, position information on coordinates of each supporting structure 25 on the first supporting plate 26, and a correspondence relationship between the position information of the flexible sub-region and the position information of the supporting structure can be preset. Once sensing the displacement of the first flexible region 21, the position sensor obtains the position information of the first flexible region 21 after moved. According to the obtained position information, the coordinates of a pull-out flexible sub-region 211, which cannot be supported by the main supporting plate 23, of the first flexible region 21 are determined. Then, according to the correspondence relationship between the flexible sub-region 211 and the supporting structure 25, the supporting structure 25 corresponding to the pull-out flexible sub-region 211, which cannot be supported by the main supporting plate 23, of the first flexible region 21 is determined to be the to-be-controlled supporting structure. A control instruction is transmitted to the to-be-controlled supporting structure, so as to control the to-be-controlled supporting structure to support the corresponding flexible sub-region 211.

By providing the position sensor and the position processing unit, the position processing unit may control the supporting state of each supporting structure according to the sensed position information of the first flexible region. Thus, it is unnecessary to provide each supporting structure with a respective position sensor, simplifying the structure and construction of the supporting structure, while increasing an integration degree of the flexible display device and simplifying the control method.

Figure 22:
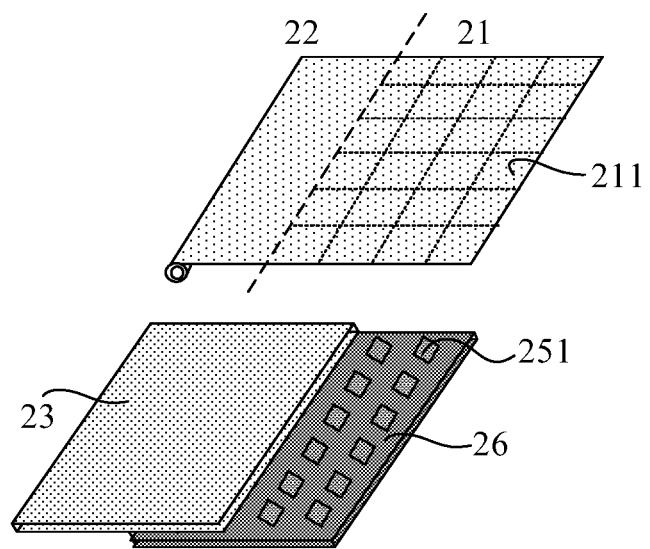
FIG. 22 is a schematic diagram of a dissembled flexible display device according to another embodiment of the present disclosure.

FIG. 22 is a schematic diagram of a dissembled flexible display device according to another embodiment of the present disclosure. As shown in FIG. 22, the first flexible region 21 is in the pull-out state, but not completely pulled out yet. That is, a part of the first flexible region 21 has not been pulled out, which is still supported by the main supporting plate 23. A part of the second flexible region is pulled out of the receiving cabin, and the remaining part is still received in the receiving cabin. With the displacement between the first flexible region 21 and the main supporting plate 2 and the displacement between the first supporting plate 26 and the main supporting plate 23, the to-be-controlled supporting structure 251 supports the pull-out part of the first flexible region 21 under the control of the position processing unit.

Further, the control instruction includes a supporting control instruction and a receiving control instruction. The pull-out state of the first flexible region 21 includes a first process in which an area of the first flexible region 21 outside the main supporting plate 23 gradually increases, and a second process in which the area of the first flexible region 21 outside the main supporting plate 23 gradually decreases. The first process in which the area of the first flexible region 21 outside the main supporting plate 23 gradually increases is a state that the second flexible region 22 is gradually flattened. The second process in which the area of the first flexible region 21 outside the main supporting plate 23 gradually decreases is a state that the second flexible region 22 is gradually bent.

In the first process in which the area of the first flexible region 21 outside the main supporting plate 23 gradually increases, the position processing unit transmits the supporting control instruction to the corresponding micro processing unit, to control the to-be-controlled supporting structure 25 to support the flexible sub-region 211 corresponding to the to-be-controlled supporting structure 25. In the first process in which the area of the pull-out part of first flexible region 21 gradually increases, the position processing unit transmits a control instruction to the micro processing unit of the to-be-controlled supporting structure in real time, such that the to-be-controlled supporting structure can support the corresponding flexible sub-region. In this way, the part of the first flexible region 21 outside the main supporting plate 23 can be effectively supported in real time.

In the second process in which the area of the first flexible region 21 outside the main supporting plate 23 gradually decreases, the position processing unit transmits the retracting control instruction to the corresponding micro processing unit, to control the to-be-controlled supporting structure 25 not to support the corresponding flexible sub-region 211. In the second process in which the area of the pull-out part of first flexible region 21 gradually decreases, the position processing unit transmits the control instruction to the micro processing unit of the to-be-controlled supporting structure corresponding to a part, supported by the main supporting plate 23, of the first flexible region 21 in real time, such that this to-be-controlled supporting structure does not support the corresponding flexible sub-region any more, thereby allowing the second flexible region 22 to be retracted.

Figure 23:
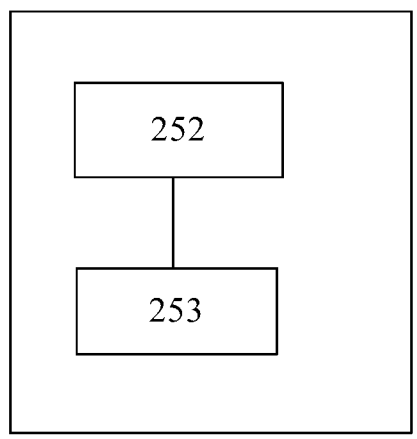
FIG. 23 is a structural block diagram of a supporting structure in a flexible display device according to an embodiment of the present disclosure.

Further, FIG. 23 is a structural block diagram of a supporting structure in a flexible display device according to an embodiment of the present disclosure. As shown in FIG. 23, the supporting structure 25 further includes a support sensor 252, which is a height sensor or a pressure sensor. The support sensor 252 is configured to sense the usage state of the flexible sub-region 211, and transmit the sensed usage state to the micro processing unit 253. The micro processing unit 253 is configured to control the supporting structure 25 to support the flexible sub-region 211 according to the sensed usage state. In the present embodiment, the support sensor 252 is provided in each of the supporting structures 25. Thus, under the control of micro processing unit 253, each supporting structure 25 can provide more accurate support for the corresponding flexible sub-region 211 according to a sensed result of the support sensor 252. In an application in a flexible display device with a touch function, when a finger presses the first flexible region 21 in the pull-out state, the finger may exert a pressing force greater than a control force for controlling the supporting height of the supporting structure 25, resulting in a reduction of the supporting height of the supporting structure 25 for the flexible sub-region 211, and further causing damage to the display panel in use. The support sensor in the present embodiment can sense the above state and feed it back to the micro processing unit, so that the micro processing unit can finely adjust the support height of the supporting structure according to the sensed result of the support sensor, thereby ensuring an optimal support height of the supporting structure for the flexible sub-region and avoiding the damage to the display panel due to pressing.

Further, the supporting structure includes a supporting body, and the supporting body includes a supporting surface at a side of the supporting body close to the flexible sub-region. The supporting structure further includes a height adjustment mechanism configured to adjust the vertical distance between the geometric center of the supporting surface and the first supporting plate under to the control of the micro processing unit.

Figure 24:
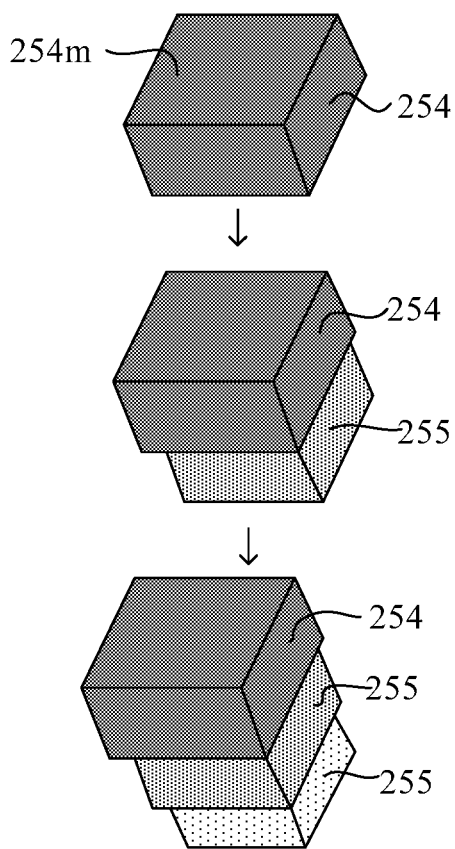
FIG. 24 is a schematic diagram of a supporting structure in a flexible display device according to another embodiment of the present disclosure.

FIG. 24 is a schematic diagram of a supporting structure in a flexible display device according to another embodiment of the present disclosure. As shown in FIG. 24, the supporting structure 25 includes a supporting body 254, and the supporting body 254 includes a supporting surface 254m at a side of the supporting body close to the flexible sub-region. The height adjustment mechanism includes at least one telescopic portion 255 telescopically connected to the supporting body 254. The telescopic portion 255 is connected to the micro processing unit. A telescopic state of the telescopic portion 255 can be adjusted under the control of the micro processing unit, such that the vertical distance between the geometric center of the supporting surface 254m and the first supporting plate can be adjusted. Thus, the supporting structure 25 can provide the height support for the flexible sub-region 211.

In addition, in the pull-type flexible display device according to an embodiment of the present disclosure, the supporting structure 25 is mainly used to provide the height support for the flexible sub-region in the pull-out state of the first flexible region. The design of the supporting structure 25 can also adopt the specific structures for providing the height support in the embodiments of FIG. 8 to FIG. 10.

Further, a control method of a flexible display device is further provided according to an embodiment of the present application. The control method can be applied to control the flexible display device provided in the embodiments shown in FIG. 20 or FIG. 21. The flexible display device includes the display panel 20, the display panel 20 includes: the first flexible region 21 and the second flexible region 22 connected to the first flexible region 21, and the first flexible region 21 is divided into the plurality of flexible sub-regions 211; the main supporting plate 23 and the receiving cabin; the plurality of supporting structures 25, one supporting structure corresponds to one flexible sub-region 211; and the first supporting plate 26 configured to support the plurality of flexible sub-regions 211.

The first flexible region 21 has two usage states including a pull-out state and an undrawn state.

In the undrawn state, the main supporting plate 23 supports the first flexible region 21, the first supporting plate 26 overlaps with the main supporting plate 23, and the first supporting plate 26 and the plurality of supporting structures are all located on a side of the main supporting plate 23 facing away from the first flexible region 21, the second flexible region 22 is received in the receiving cabin.

Figure 25:
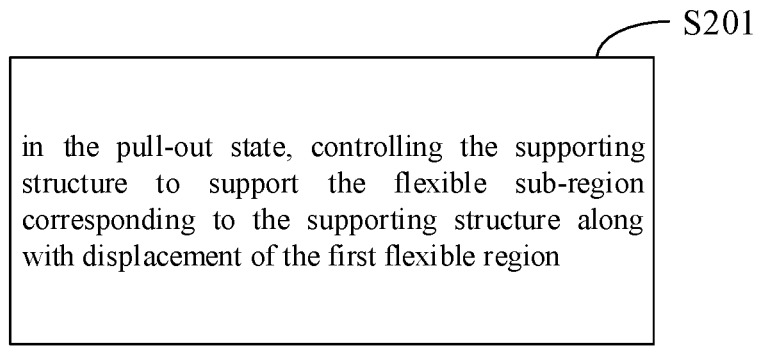
FIG. 25 is a flowchart of a control method of a flexible display device according to another embodiment of the present disclosure.

In the pull-out state, a displacement occurs between the first flexible region 21 and the main supporting plate 23, at least a part of second flexible region 22 is pulled out of the receiving cabin with the displacement of the first flexible region 21, and a pull-out part of the second flexible region 22 is supported by the main supporting plate 23; meanwhile, a displacement occurs between the first supporting plate 26 and the main supporting plate 23. FIG. 25 is a flowchart of a control method of a flexible display device according to yet another embodiment of the present disclosure. As shown in FIG. 25, the control method includes the following steps.

Step S201: In the pull-out state, the supporting structure 25 is controlled to support the flexible sub-region 211 corresponding to the supporting structure 25 along with the displacement of the first flexible region. When the first flexible region is in the pull-out state, a displacement of the first supporting plate with respect to the main supporting plate occurs, and thus the supporting structures carried by the first supporting plate support the flexible sub-regions corresponding to these supporting structures along with the displacement of the first flexible region. Thus, the first flexible region can be effectively supported even in the pull-out state, guaranteeing the flatness of the first flexible region when the first flexible region and the second flexible region are together used for display, thereby improving user experience. In addition, by controlling the supporting structure support the first flexible region in the pull-out state, the functions of the first flexible region, such as touch function, can be advantageously achieved in the pull-out state.

Figure 26:
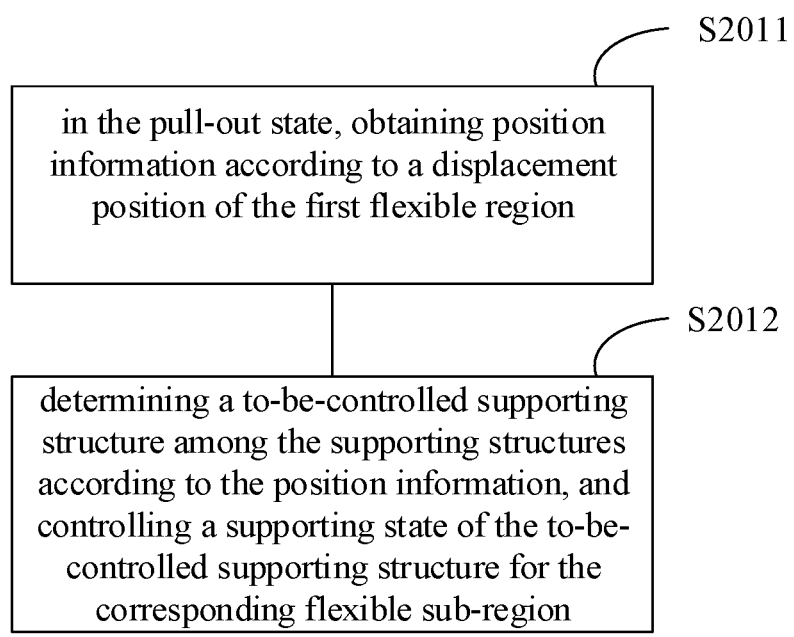
FIG. 26 is a flowchart of a control method of a flexible display device according to another embodiment of the present disclosure.

Further, FIG. 26 is a flowchart of a control method of a flexible display device according to another embodiment of the present disclosure. As shown in FIG. 26, in the pull-out state, the controlling the supporting structure 25 to support the flexible sub-region 211 corresponding to the supporting structure 25 along with the displacement of the first flexible region 211, includes: step S2011 and step S2012. In S2011, in the pull-out state, position information is obtained according to the displacement position of the first flexible region 211. In S2012, the to-be-controlled supporting structure is determined among the plurality of supporting structures 25 according to the position information, and a supporting state of the to-be-controlled supporting structure for the corresponding flexible sub-region 211 is controlled.

For example, position information of coordinates of each flexible sub-region 211 on the display panel, position information of coordinates of each supporting structure 25 on the first supporting plate 26, and a correspondence relationship between the position information of the flexible sub-region and the position information of the supporting structure can be preset. The position sensor is provided to sense the displacement of the first flexible region 21 to obtain the position information of the first flexible region 21 after moved. According to the obtained position information, the coordinates of the pull-out flexible sub-region 211, which cannot be supported by the main supporting plate 23, of the first flexible region 21 are determined. Then, according to the correspondence relationship between the flexible sub-region 211 and the supporting structure 25, the supporting structure 25 corresponding to the pull-out flexible sub-region 211, which cannot be supported by the main supporting plate 23, of the first flexible region 21 is determined to be the to-be-controlled supporting structure. Then, the to-be-controlled supporting structure is controlled to support the corresponding flexible sub-region 211. According to the position information of the first flexible region, the supporting state of each supporting structure can be controlled. Thus, it is unnecessary to provide each supporting structure with a respective position sensor, simplifying the structure and construction of the supporting structure, while increasing an integration degree of the flexible display device and simplifying the control method.

Figure 27:
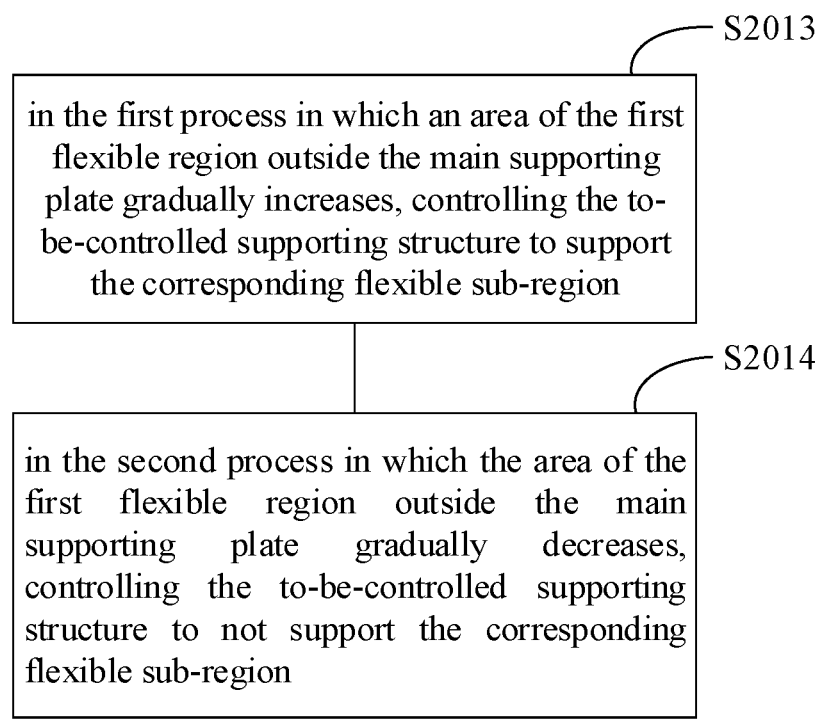
FIG. 27 is a flowchart of a control method of a flexible display device according to another embodiment of the present disclosure.

Further, the pull-out state of the first flexible region includes a first process in which an area of the first flexible region outside the main supporting plate gradually increases, and a second process in which the area of the first flexible region outside the main supporting plate gradually decreases. FIG. 27 is a flowchart of a control method of a flexible display device according to another embodiment of the present disclosure. As shown in FIG. 27, the controlling the supporting state of the to-be-controlled supporting structure for the corresponding flexible sub-region, includes the following steps.

Step S2013: in the first process in which an area of the first flexible region outside the main supporting plate gradually increases, the to-be-controlled supporting structure is controlled to support the corresponding flexible sub-region 211.

Step S2014: in the second process in which the area of the first flexible region outside the main supporting plate gradually decreases, the to-be-controlled supporting structure is controlled to not support the corresponding flexible sub-region 211.

In the first process in which the area of the pull-out part of the first flexible region 21 gradually increases, the to-be-controlled supporting structure is controlled in real time to support the corresponding flexible sub-region, guaranteeing the part of the first flexible region 21 outside the main supporting plate 23 to be effectively supported in real time. In addition, in the second process in which the area of the pull-out part of the first flexible region 21 gradually decreases, the to-be-controlled supporting structure corresponding to a part supported by the main supporting plate 23 of the first flexible region 21 is controlled in real time to not support the corresponding flexible sub-region anymore, thereby allowing the second flexible region 22 to be retracted.

The above only illustrates some preferred embodiments and does not limit the present disclosure. Any modification, equivalent replacement, improvement, etc. made within the spirit and principle of this disclosure shall fall within the scope of disclosure.

It should be understood that the above embodiments are merely for the purpose of explaining the technical solutions of the present disclosure, but are not intended to limit the present disclosure. Although the present application is described in detail with reference to the above embodiments, those skilled in the art can improve or modify the above embodiments, or equivalently substitute some or all of the technical features. These modification or substitutions shall not depart from the essence of the present disclosure.

What is claimed is:

1. A flexible display device, comprising:
    a display panel comprising a first flexible region, a second region, and a third region, the first flexible region being divided into a plurality of flexible sub-regions;
    a plurality of supporting structures, wherein each supporting structure of the plurality of supporting structures corresponds to a respective flexible sub-region of the plurality of flexible sub-regions, each supporting structure of the plurality of supporting structures comprises a supporting body, and the supporting body comprises a supporting surface close to a corresponding flexible sub-region of the plurality of flexible sub-regions; and
    a first supporting plate configured to support the plurality of supporting structures,
    wherein the first flexible region has usage states comprising a flattened state and a bent state; in the flattened state, the second region, the first flexible region, and the third region are sequentially arranged in a first direction; in the bent state, the first flexible region is bent, the display panel has a bending angle θ, θ satisfies 0°≤θ<180°, and the bending angle θ is an angle between the second region and the third region, and
    wherein the plurality of supporting structures is configured to support the first flexible region according to the usage states of the first flexible region, by changing a vertical distance between a geometric center of the supporting surface and the first supporting plate with a vertical distance between the first supporting plate and a geometric center of a flexible sub-region corresponding to the supporting surface.

2. The flexible display device according to claim 1, wherein each supporting structure of the plurality of supporting structures comprises a height adjustment mechanism configured to adjust the vertical distance between the geometric center of the supporting surface and the first supporting plate.

3. The flexible display device according to claim 2, wherein the supporting body comprises:
    a top portion; and
    a side portion connected to the top portion, wherein the top portion comprises the supporting surface; in the flattened state, the top portion is parallel to the first supporting plate, and the side portion is perpendicular to the first supporting plate,
    wherein the supporting structure comprises a main body, and the main body comprises two sliding grooves extending in a direction perpendicular to the first supporting plate, and
    wherein the height adjustment mechanism comprises sliding columns connected to two sides of the side portion respectively, the sliding columns are respectively engaged in the two sliding grooves and is configured to slide in the sliding grooves to drive the supporting body to move in the direction perpendicular to the first supporting plate.

4. The flexible display device according to claim 2, wherein the supporting body comprises:
    a top portion; and
    a side portion connected to the top portion, wherein the top portion comprises the supporting surface; in the flattened state, the top portion is parallel to the first supporting plate, and the side portion is perpendicular to the first supporting plate,
    wherein the supporting structure comprises a main body slidably connected to the side portion, and the side portion is slidable with respect to the main body along a direction perpendicular to the first supporting plate, and
    wherein the height adjustment mechanism comprises a connecting rod perpendicular to the first supporting plate and configured to support the top portion to move along the direction perpendicular to the first supporting plate.

5. The flexible display device according to claim 2, wherein each supporting structure of the plurality of supporting structures further comprises an angle adjustment mechanism configure to allow each supporting structure of the plurality of supporting structures to provide an angled support for a corresponding flexible sub-region.

6. The flexible display device according to claim 5, wherein the supporting body comprises:
a top portion; and
a side portion connected to the top portion, wherein the top portion comprises the supporting surface; in the flattened state, the top portion is parallel to the first supporting plate, and the side portion is perpendicular to the first supporting plate,
wherein the supporting structure comprises a rotation shaft parallel to the first supporting plate and rotationally connected to side portion, and
wherein the angle adjustment mechanism is configured to control the side portion to rotate about the rotation shaft, so as to change an angle of the supporting surface with respect to the first supporting plate.

7. The flexible display device according to claim 6, wherein the angle adjustment mechanism comprises an elastic member, and a connecting block connected to the elastic member, and
wherein the elastic member is configured to apply an elastic force to the connecting block, and the connecting block is configured to transmit the elastic force to the side portion, to control the side portion to rotate about the rotation shaft.

8. The flexible display device according to claim 1, wherein the supporting body comprises:
a top portion; and
a side portion connected to the top portion, wherein the top portion comprises the supporting surface; in the flattened state, the top portion is parallel to the first supporting plate, and the side portion is perpendicular to the first supporting plate,
wherein the first flexible region is provided with a virtual bending axis,
wherein in the flattened state, the virtual bending axis and the first direction are perpendicular to each other, and
wherein an intersection line of a plane of the side portion and a plane of the top portion is parallel to the virtual bending axis.

9. The flexible display device according to claim 8, wherein the plurality of supporting structures comprises a first supporting structure and a second supporting structure;
wherein the first supporting structure and the second supporting structure are respectively located at two sides of the virtual bending axis in the first direction,
wherein the top portion of the first supporting structure has a first end close to the virtual bending axis and a second end facing away from the virtual bending axis, and the side portion of the first supporting structure is connected to, at the second end, the top portion of the first supporting structure, and
wherein the top portion of the second supporting structure has a third end close to the virtual bending axis and a fourth end facing away from the virtual bending axis, and the side portion of the second supporting structure is connected to, at the fourth end, the top portion of the second supporting structure.

10. The flexible display device according to claim 1, further comprising a protective housing located at a side of the first supporting plate facing away from the display panel and fixedly connected to the first supporting plate.

11. The flexible display device according to claim 1, further comprising:
a second supporting plate connected to the second region and configured to support the second region; and
a third supporting plate connected to the third region and configured to support the third region,
wherein the second supporting plate is rotationally connected to the first supporting plate, and the third supporting plate is rotationally connected to the first supporting plate.

12. A control method of a flexible display device, the flexible display device comprising: a display panel comprising a first flexible region, a second region, and a third region, the first flexible region being divided into a plurality of flexible sub-regions; a plurality of supporting structures, each supporting structure of the plurality of supporting structures corresponding to a respective one of the plurality of flexible sub-regions, wherein each supporting structure of the plurality of supporting structures comprises a supporting body, and the supporting body comprises a supporting surface close to a corresponding flexible sub-region of the plurality of flexible sub-region; and a first supporting plate configured to support the plurality of supporting structures,
wherein the first flexible region has usage states comprising a flattened state and a bent state; in the flattened state, the second region, the first flexible region, and the third region are sequentially arranged in a first direction; in the bent state, the first flexible region is bent, the display panel has a bending angle θ, θ satisfies 0°≤θ<180°, and the bending angle θ is an angle between the second region and the third region, and
wherein the control method comprises: controlling the plurality of supporting structures to support the first flexible region according to the usage states of the first flexible region, wherein the controlling the plurality of supporting structures to support the first flexible region according to the usage states of the first flexible region comprises: controlling a vertical distance between a geometric center of the supporting surface and the first supporting plate to change with a vertical distance between the first supporting plate and a geometric center of a flexible sub-region corresponding to the supporting surface.

13. The control method according to claim 12, wherein the vertical distance between the geometric center of the supporting surface and the first supporting plate has a positive correlation with the vertical distance between the geometric center of a corresponding flexible sub-region and the first supporting plate.

14. The control method according to claim 12, wherein the bent state comprises a first bending stage and a second bending stage; in the first bending stage, the display panel has a first bending angle θ1; and in the second bending stage, the display panel has a second bending angle θ2; wherein θ1<θ2;
the control method comprises:
in the first bending stage and the second bending stage, controlling the vertical distance between the geometric center of the supporting surface and the first supporting plate to change with the vertical distance between the geometric center of the corresponding flexible sub-region and the first supporting plate; and
controlling the vertical distance between the geometric center of the supporting surface and the first supporting plate in the first bending stage to be different from the vertical distance between the geometric center of the supporting surface and the first supporting plate in the second bending stage.

15. The control method according to claim 12, wherein the controlling the vertical distance between the geometric center of the supporting surface and the first supporting plate to change with the vertical distance between the first supporting plate and a geometric center of a flexible sub-region corresponding to the supporting surface comprises:
sensing the bending angle θ of the display panel in the bent state, and searching for to-be-supported heights of the plurality of supporting structures in a preset first relationship table according to the sensed bending angle, wherein the preset first relationship table comprises a correspondence relationship between the bending angle of the display panel and a supporting height of each of the plurality of supporting structures; and
according to the to-be-supported heights, controlling the plurality of supporting structures to provide height supports for the corresponding flexible sub-regions.

16. The control method according to claim 15, wherein the preset first relationship table further comprises a correspondence relationship between the bending angle of the display panel and the supporting angle of each of the plurality of supporting structures, and
wherein the control method further comprises:
searching for to-be-supported angles of the plurality of supporting structures in the preset first relationship table according to the sensed bending angle, and
according to the to-be-supported angles, controlling the plurality of supporting structures to provide angled supports for the corresponding flexible sub-regions.

17. The control method according to claim 12, wherein said controlling the vertical distance between the geometric center of the supporting surface and the first supporting plate to change with the vertical distance between the first supporting plate and a geometric center of a flexible sub-region corresponding to the supporting surface comprises:
sensing the vertical distance between the geometric center of the corresponding flexible sub-region and the first supporting plate, and obtaining a to-be-supported height according the sensed vertical distance; and
controlling the supporting structure to provide a height support for the corresponding flexible sub-region according to the to-be-supported height.

18. The control method according to claim 17, further comprising:
sensing a state angle of the flexible sub-region corresponding to the supporting structure in the bent state of the display panel, wherein the state angle is an angle included between the flexible sub-region and the first supporting plate;
searching for to-be-supported angle of the supporting structure in a preset second relationship table according to the sensed state angle, wherein the preset second relationship table comprises a correspondence relationship between the state angle of the flexible sub-regions and the supporting angle of the supporting structure; and
controlling the plurality of supporting structures to provide angled supports for the corresponding flexible sub-regions according to the to-be-supported angles.

19. A flexible display device, comprising:
a display panel comprising a first flexible region, and a second flexible region connected to the first flexible region, the first flexible region being divided into a plurality of flexible sub-regions;
a main supporting plate;
a receiving cabin;
a plurality of supporting structures, each supporting structure of the plurality of supporting structures corresponding to a respective flexible sub-region of the plurality of flexible sub-regions; and
a first supporting plate configured to support the plurality of supporting structures,
wherein the first flexible region has usage states comprising a pull-out state and an undrawn state,
wherein, in the undrawn state, the main supporting plate supports the first flexible region, the first supporting plate overlaps with the main supporting plate, the first supporting plate and the plurality of supporting structures are all located on a side of the main supporting plate facing away from the first flexible region, and the second flexible region is received in the receiving cabin, and
wherein, in the pull-out state, a displacement occurs between the first flexible region and the main supporting plate, at least a part of the second flexible region is pulled out of the receiving cabin with the displacement of the first flexible region, and a pull-out part of the second flexible region is supported by the main supporting plate; and a displacement occurs between the first supporting plate and the main supporting plate, and the supporting structure supports the flexible sub-region corresponding to the supporting structure with the displacement of the first flexible region.

20. A control method of a flexible display device, the flexible display device comprising: a display panel comprising a first flexible region, and a second flexible region connected to the first flexible region, the first flexible region being divided into a plurality of flexible sub-regions; a main supporting plate; a receiving cabin; a plurality of supporting structures, each supporting structure of the plurality of supporting structures corresponds to a respective flexible sub-region of the plurality of flexible sub-regions; and a first supporting plate configured to support the plurality of supporting structures,
wherein the first flexible region has usage states comprising a pull-out state and an undrawn state,
wherein, in the undrawn state, the main supporting plate supports the first flexible region, the first supporting plate overlaps with the main supporting plate, the first supporting plate and the plurality of supporting structures are all located on a side of the main supporting plate facing away from the first flexible region, and the second flexible region is received in the receiving cabin, and
wherein, in the pull-out state, a displacement occurs between the first flexible region and the main supporting plate, at least a part of second flexible region is pulled out of the receiving cabin with the displacement of the first flexible region, and a pull-out part of the second flexible region is supported by the main supporting plate; and a displacement occurs between the first supporting plate and the main supporting plate, and
wherein the control method comprises:
in the pull-out state, controlling at least one supporting structure to support a flexible sub-region corresponding to the at least one supporting structure along with the displacement of the first flexible region.

* * * * *